(12) United States Patent
Chouzenoux et al.

(10) Patent No.: US 7,140,434 B2
(45) Date of Patent: Nov. 28, 2006

(54) SENSOR SYSTEM

(75) Inventors: Christian Chouzenoux, St. Cloud (FR); Jacques Jundt, Bethel, CT (US); Philippe Salamitou, Mamaroneck, NY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 321 days.

(21) Appl. No.: 10/887,508

(22) Filed: Jul. 8, 2004

(65) Prior Publication Data

US 2006/0005965 A1 Jan. 12, 2006

(51) Int. Cl.
*E21B 47/00* (2006.01)
*E21B 43/11* (2006.01)

(52) U.S. Cl. .............. 166/250.11; 166/297; 166/250.15

(58) Field of Classification Search ........... 166/250.04, 166/254.2
See application file for complete search history.

(56) References Cited

U.S. PATENT DOCUMENTS

| | | | |
|---|---|---|---|
| 4,216,536 A * | 8/1980 | More | 367/83 |
| 5,692,565 A | 12/1997 | MacDougall et al. | |
| 6,464,021 B1 * | 10/2002 | Edwards | 175/61 |
| 6,896,056 B1 * | 5/2005 | Mendez et al. | 166/254.2 |
| 2002/0195247 A1 | 12/2002 | Ciglenec et al. | |
| 2003/0137429 A1 | 7/2003 | Clark et al. | |

* cited by examiner

*Primary Examiner*—Frank S. Tsay
(74) *Attorney, Agent, or Firm*—Victor H. Segura; Brigitte L. Echols

(57) ABSTRACT

A sensor for installation in an underground well having a casing or tubing installed therein, the sensor comprising: a sensor body that can be installed in a hole formed in the casing or tubing so as to extend between the inside and outside of the casing or tubing; sensor elements located within the body and capable of sensing properties of an underground formation surrounding the well; and communication elements located within the body and capable of communicating information between the sensor elements and a communication device in the well; wherein the sensor body also includes a portion that can be sealed to the casing or tubing to prevent fluid communication between the inside and the outside of the casing or tubing through the hole when the sensor body is installed therein. The invention also provides systems incorporating such sensors, methods for installing sensors and applications of such systems. The sensors can include pressure, temperature, resistivity, conductivity, stress, strain, pH and chemical composition sensors.

35 Claims, 23 Drawing Sheets

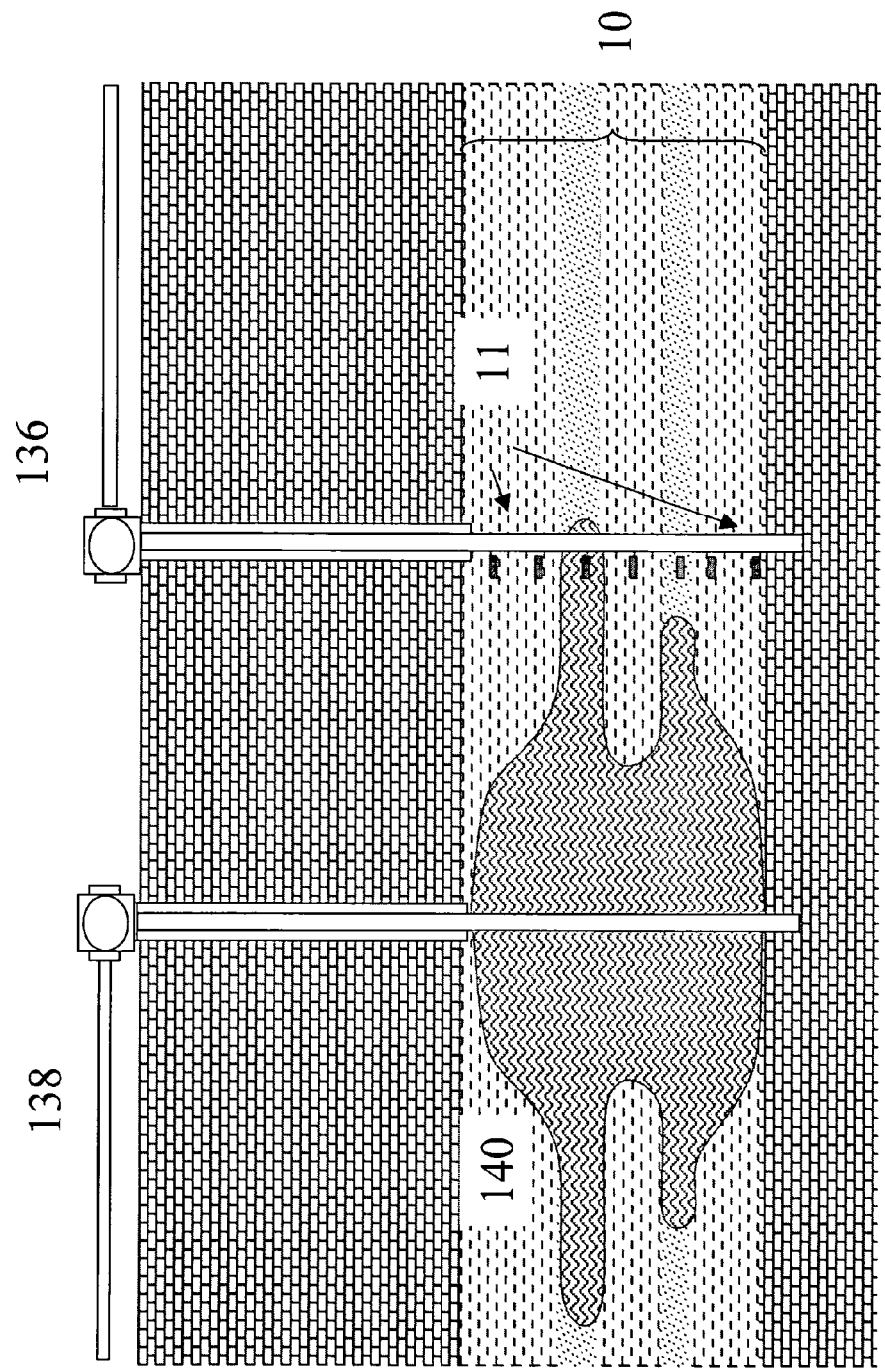

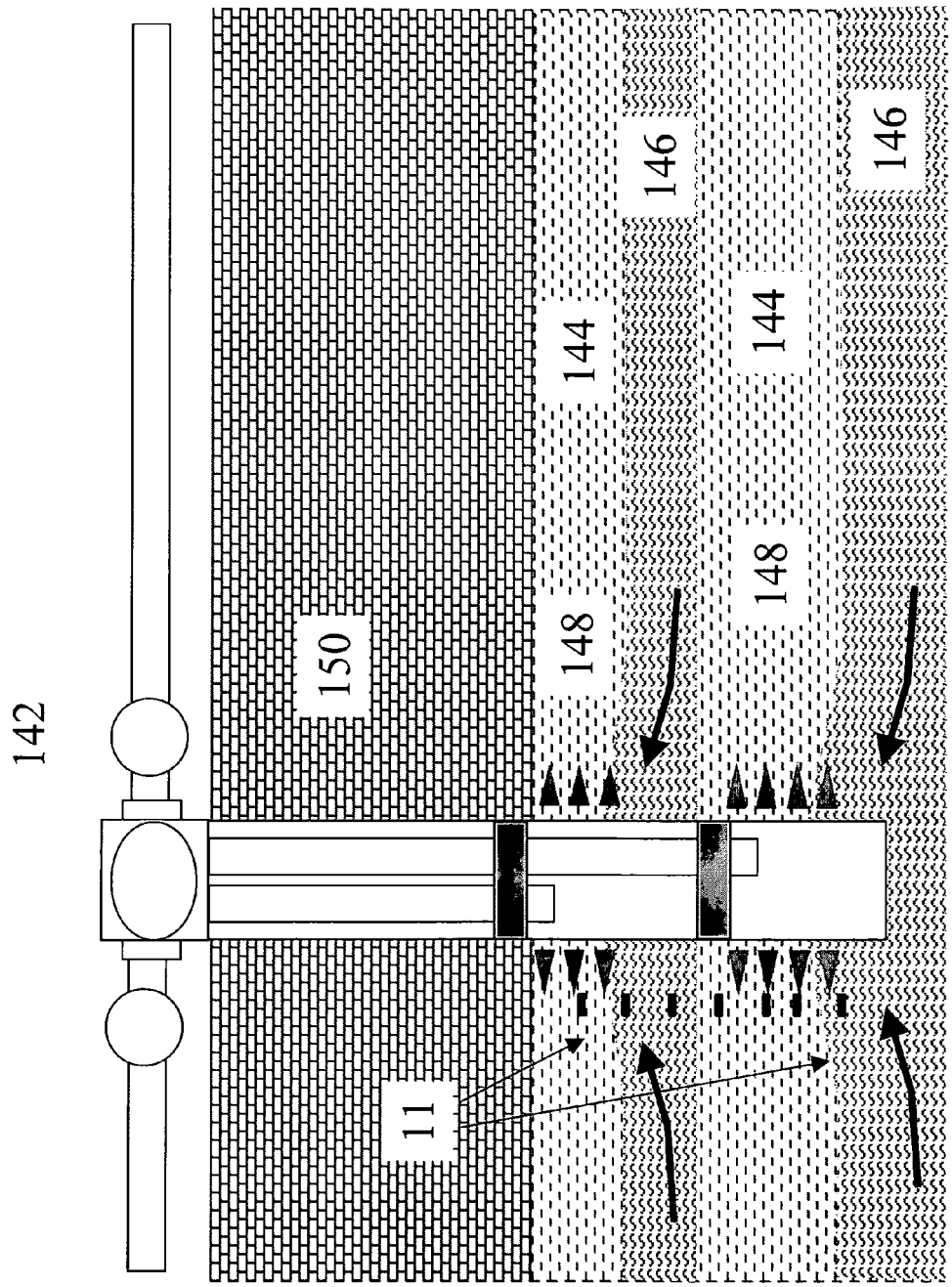

SENSOR SYSTEM

This invention relates to sensors for installation in oil, water or gas wells or the like. It also relates to systems including such sensors and to methods of installing sensors and systems in wells.

US 2002/0195247 entitled "Well-bore sensor apparatus and method" proposes a plug sensor for installation in the underground formation surrounding a well such as an oil or gas well. The sensor plug contains sensing elements and a communication system that allows measurement from the sensing elements to be collected and returned to the surface for analysis. The plug is typically installed in the formation after the well has been drilled but before it is cased. However, it is also possible to install the sensor plug after casing by drilling through the casing and into the formation, installing the sensor plug into the hole extending into the formation and then sealing the hole to prevent fluid entry into the well at that point. Communication with the sensor plug can be by wireless communication. This can be facilitated by the use of non-conductive casing near the sensors or by installing antennae extending through the casing which can be accessed from within the casing.

This invention seeks to provide a sensor plug system that does not need to use separate antennae when communicating with sensor plugs from within cased wells.

A first aspect of the invention provides a sensor for installation in an underground well having a casing or tubing installed therein, the sensor comprising: a sensor body that can be installed in a hole formed in the casing or tubing so as to extend between the inside and outside of the casing or tubing; sensor elements located within the body and capable of sensing properties of an underground formation surrounding the well; and communication elements located within the body and capable of communicating information between the sensor elements and a communication device in the well; wherein the sensor body also includes a portion that can be sealed to the casing or tubing to prevent fluid communication between the inside and the outside of the casing or tubing through the hole when the sensor body is installed therein.

The sensor typically further comprising an electronics package in a protective housing connecting the sensing elements and the communication elements.

The communication elements can comprise a transducer for electromagnetic or acoustic (e.g. ultrasonic) wireless communication with a communication device inside the casing. The transducer can also be used to provide power to functional elements in the plug As well as the transducer, power can also be provided to functional elements of the sensor by means of a battery installed in the sensor body. In certain cases, the battery can be recharged by power supplied from the communication device via the transducer.

The electronics package can comprise: a signal conditioning and analogue to digital conversion stage which receives data from the sensor elements; a micro-controller and memory unit for receiving data from the signal conditioning stage; a wireless transmission and reception controller; and a power supply stage.

The sensing elements are preferably sensitive to one or more of the following: pressure, temperature, resistivity, conductivity, stress, strain, pH and chemical composition.

For a sensor comprising pressure sensing elements, the sensor body can include a pressure chamber having a pressure port that allows fluid pressure communication between the outside of the sensor body and the pressure chamber, wherein the pressure sensing elements are located inside a protection and coupling mechanism which separates the pressure sensing elements from fluid inside the pressure chamber but transmits changes in pressure of the fluid in the pressure chamber to the sensing elements. The protection and coupling mechanism preferably comprises fluid-filled bellows surrounding the sensing elements.

For a sensor comprising resistivity sensing elements, the sensor body can have an insulating coating on the outer surface with at least one current injection electrode and at least one monitoring electrode provided on the outside of the body. It is particularly preferred that pairs of current and monitoring electrodes are provided. The current electrodes can be connected to a current generator, and the monitoring electrodes connected to a voltage generator.

Alternatively, the resistivity sensing elements include a toroidal antenna formed around the sensor body. Such a sensor may also include an electrode for radiating current into the formation. The sensor may also comprise two toroidal antennae, one acting as an emission antenna, the other acting as a monitoring antenna.

Another form of resistivity sensing elements include a coil antenna formed on the sensor body for measuring electrical impedance of the formation. As with the toroidal antennae, two antennae can be provided, one acting as an emission antenna, the other acting as a monitoring antenna.

In another embodiment, the sensing elements comprise strain sensing elements, a strain gauge being mounted in the sensor body near to the portion that is sealed to the tubing or casing. The strain gauge can be oriented to measure vertical or tangential deformation of the tubing or casing.

A second aspect of the invention provides a sensor system for installation in an underground well having a casing or tubing installed therein, the system comprising one or more sensors as described above installed in the tubing or casing, and a communication device that can be positioned inside the well to communicate with the sensor elements of the or each sensor via the respective communication elements.

The communication device typically comprises a sonde, such as a wireline sonde, that can be moved through the well and that communicates with the sensors by wireless communication.

When the well comprises a cased well having a tubing located therein and the sensors are installed in the casing and the communication device is positioned inside the tubing, the portion of the tubing in the region of the sensors is preferably constructed so as to allow communication between the sensors and the communication device. For example, the tubing can have non-conductive portions in the region of the sensors. Alternatively, when the well comprises a cased well having a tubing located therein and the sensors are installed in the casing, the communication device can be located on the outside of the tubing near to the sensors.

A third aspect of the invention provides a method of installing a sensor, comprising:
  drilling a hole through the casing or tubing at a location of interest;
  installing a sensor as described above in the hole; and
  sealing the sensor in the hole such that there is no fluid communication between the inside and the outside of the casing or tubing through the hole.

The steps of drilling, installing and sealing can be performed by a tool that can be moved through the well to a number of locations, for example a wireline tool. Such a tool can be loaded with a number of sensors which are installed at spaced locations in the well.

A fourth aspect of the invention provides a method of monitoring an underground formation surrounding a well, comprising:

installing a number of sensors as described above in the well;

monitoring variation in the measurements made by the sensors overtime; and inferring formation properties from the time varying measurements.

In one embodiment, the method comprises measuring the time varying flow rate of fluids from the well over a period of time; monitoring time varying pressure at each of the sensors over the period of time; and determining the contribution of a layer in which a sensor is installed to the overall flow from the time varying flow rate and the time varying pressure measured at the respective sensor.

In a further embodiment wherein the sensors are pressure sensors installed above a perforated region of the well, the method comprises monitoring time varying pressure gradient between a pair of the sensors over a period of time so as to determine changes in formation fluid density; and determining gas entry into the well through the formations from the determined changes in formation fluid density.

Also, when the sensors are pressure sensors installed in a cap rock above a producing formation, the method comprises monitoring time varying pressure measurements with the sensors over a period of time; and detecting any leakage at the cap rock level from the determined time varying pressure measurements.

Another embodiment, wherein the sensors are pressure sensors installed in a first well, comprises varying the flow rate of fluids from a second well spaced from the first well but in the same producing formation over a period of time so as to create a pressure pulse in the reservoir; monitoring time varying pressure at each of the sensors in the first well over the period of time; and determining the inter-well permeability from the time varying measurements.

A still further embodiment, wherein the sensors are resistivity sensors installed in a producing well at the level of a producing formation, comprises injecting water over a period of time into the producing formation from an injection well spaced from the producing well; monitoring variation of resistivity measured at the sensors in the producing well over the period of time as the water is injected; and determining progress of a water front through the producing formation from the measured resistivity.

In another embodiment, wherein the sensors are resistivity sensors installed below a perforated interval of the well, the method comprises measuring the resistivity at the sensors over time, and determining the advance of water towards the perforated interval from the resistivity measurements.

Other methods and interpretations based on these principles are also possible within the scope of the invention.

The invention will now be described in relation to the accompanying drawings, in which:

FIG. 22 shows a system for monitoring water-fronts; and

FIG. 23 shows a system for monitoring water coning in a dual tubing completion.

Figure 1:
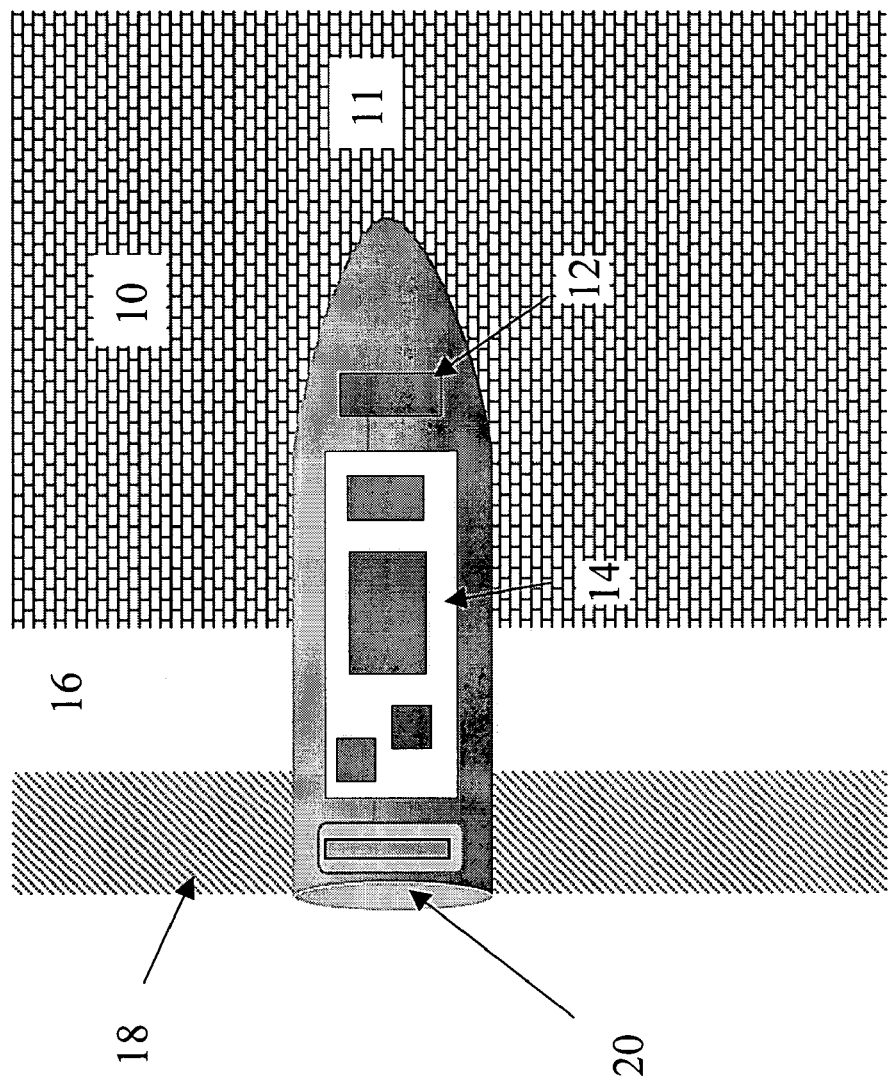
FIG. 1 shows a general view of a sensor plug according to the invention.

The sensor plug 11 according to the invention can be provided in the form of a miniaturized and integrated device that is permanently deployed in underground formation 10 with embedded sensors 12 and dedicated electronics 14. The sensor plug is aimed at deployment in well completion elements such as in casing or tubing. After drilling a micro-hole, the plug is sealed inside the wall of the pipe. FIG. 1 shows an example of smart plug placement inside a cemented casing 16, 18.

The sensor plug includes the following parts:

sensing elements 12, an electronics platform 14 inside a protective housing, a communication antenna 20.

The plug is autonomous and has integrated functionalities in order to perform dedicated tasks such as data acquisition, internal data saving and communication with an external interrogating tool. If required, an embedded micro-controller will manage and schedule the different acquisition, processing and communication functions.

Figure 2:
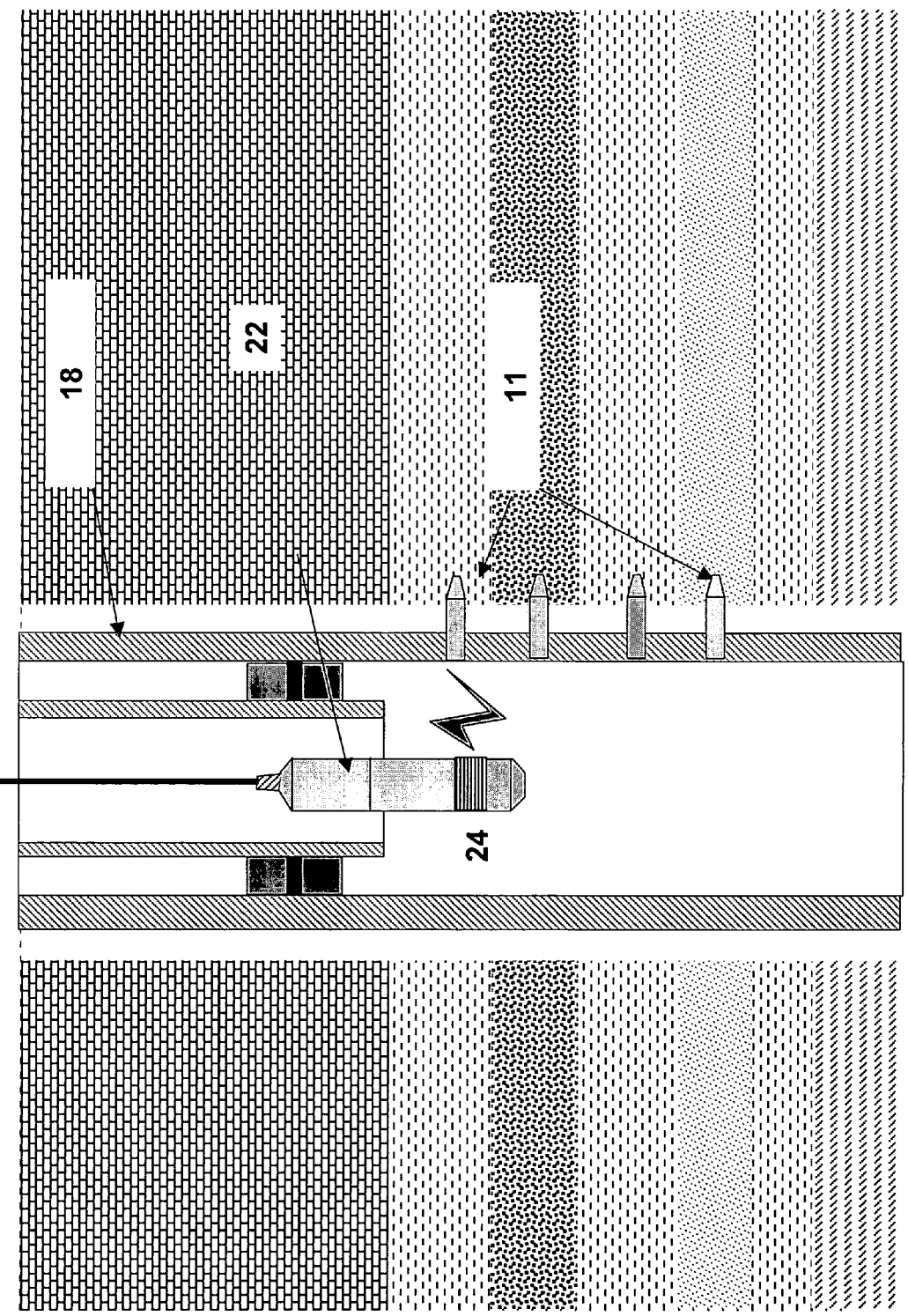
FIG. 2 shows a system for communicating with sensor plugs using a wireline tool.

The principle for interrogation of the sensor plug shown in FIG. 1 is based on a wireless communication between the plug 11 and a proximate interrogating tool 22, as shown in FIG. 2.

In this example, the plugs 11 are deployed in a well casing 18. The plugs 11 are interrogated by a wireline tool 22 equipped with an antenna and dedicated electronics. The tool 22 is run into the hole and is positioned proximate the depth of the plugs 11. The interrogating tool 22 is equipped with an electro-magnetic (EM) antenna 24. The antenna 24 is pointing towards the inside of the casing 18 and oriented for optimum coupling with the interrogating tool antenna. When the tool 22 is proximate the plug 11, EM coupling between the two antennae is effective and ensures the wireless communication. The data acquired by the plug 11 are transferred to the wireline-tool 22 and sent up-hole for further analysis.

The same antenna 24 can be used both for communication link with the interrogating tool 22 and for power transfer. The antenna is based on EM coupling and is embedded in a non-conductive material, such as epoxy.

Scanning the borehole completes successive activation and reading of different smart plugs. Two interrogating modes can be implemented, in logging or stationary mode. For short interrogation, the plug interrogation can be made in logging mode. For a long interrogation time, the sonde will stay stationary.

Another communication principle based on acoustic wave propagation can also be used to establish a wireless link between the plug 11 and the interrogating tool 22. Piezoelectric receivers and transmitters can be implemented in the plug 11 and in the interrogating tool 22 in order to ensure the communication link.

As opposed to previous technique for permanent monitoring (as described in U.S. Pat. No. 5,642,051, for example) there is no cable outside the completion element such as the well casing or tubing. Having no cable to clamp to the surface means that the well construction can be performed according to standard procedure, with no extra rig-time. Casing reciprocating and rotation will also be feasible, which is often a required operation to achieve a good cement job. This can be of high importance to achieve effective pressure insulation between the different reservoir layers.

In some configurations, the wireline tool 22 directly energizes the plug 11 electronics in a wireless mode. In this case, the power supply is recovered from the antenna 20 by electro-magnetic coupling with the wireline tool antenna 24. The plug antenna 20 is pointing towards the inside of the casing or tubing. The wireless power transfer can be used in combination with low power electronics inside the plug so that the requirements in term of electrical consumption will be extremely small.

An alternative technique uses battery cells for power. The plug is activated via embedded batteries that will provide a limited autonomy to the plug circuits. This recording functionality allows recording time-lapse data during long period of time, without wireline tool activation. The wireline tool is used only to trigger the acquisition and unload the data from the plugs. This recorder functionality can be of high interest to monitor the long-term behavior of the reservoir as it is produced. To achieve this objective, a small dimension battery cell is added inside the plug in order to power the acquisition and recorder functionalities during the duration of the monitoring.

Figure 3:
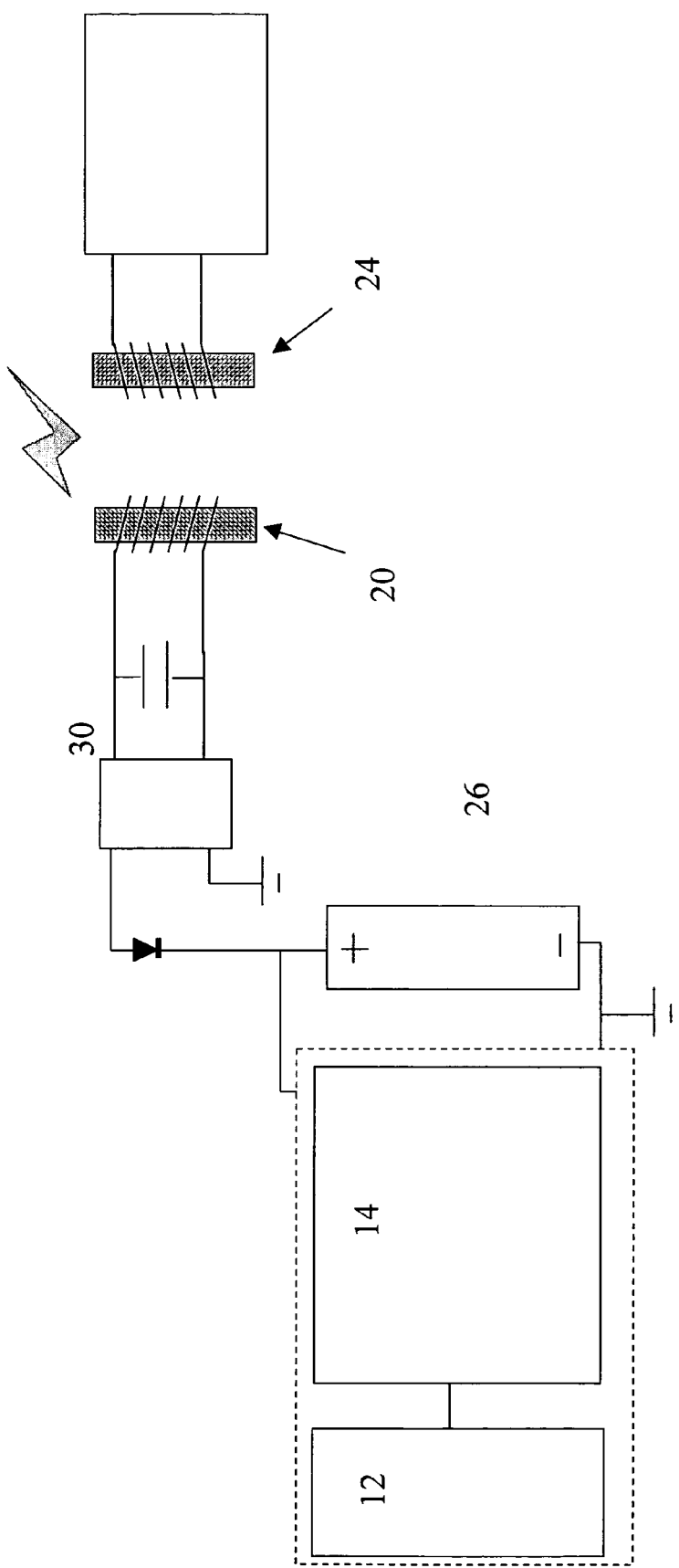
FIG. 3 shows the basic circuit elements of the plug, communication and power transfer tool.

In another configuration, as shown in FIG. 3, the plug 11 is equipped with miniaturized and re-chargeable battery cells 26. When running the wireline tool 22 proximate the plug 11, the emitting circuits 28 in the tool 22 energize the battery 26 by EM coupling between the two antennae 20, 24 via an AC to DC rectifier 30.

Figure 4:
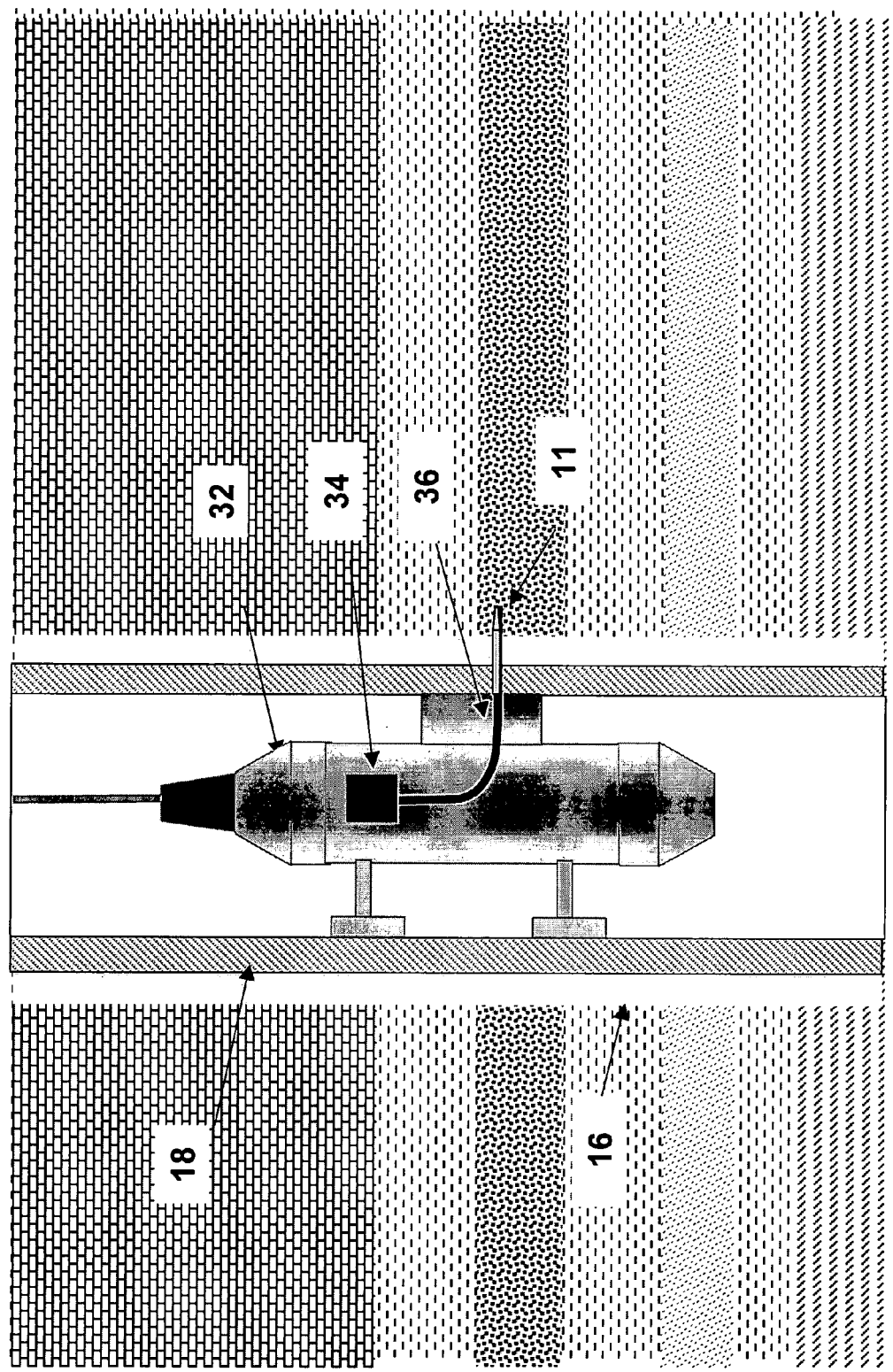
FIG. 4 shows a wireline tool for plug deployment in cased hole.

The plug 11 can be installed into the cased hole using the technique described in US 2002/0195247 (incorporated herein by reference). As is shown in FIG. 4, a carrying tool 32, comprising a drilling motor 34, a flexible drilling shaft 36 an carrying one or more plugs 11, is deployed in the well and positioned at the targeted depth for drilling a small diameter micro-hole into the casing 18. The carrying tool 32 is accurately positioned in depth according to the known formation layering. This is an advantage of the technique as the plug placement can be very accurate along the hole. The plug 11 is then inserted into the micro-hole and sealed to the borehole casing 18. A sealing technique is applied to ensure the pressure integrity between the plug 11 and the casing wall 18. The sealing technique is described in U.S. Pat. No. 5,692,565 (incorporated herein by reference). One or more plugs 11 can be deployed in a well in this manner. A large number of plugs 11 can be placed along the cased borehole to form an array of sensors.

Figure 5:
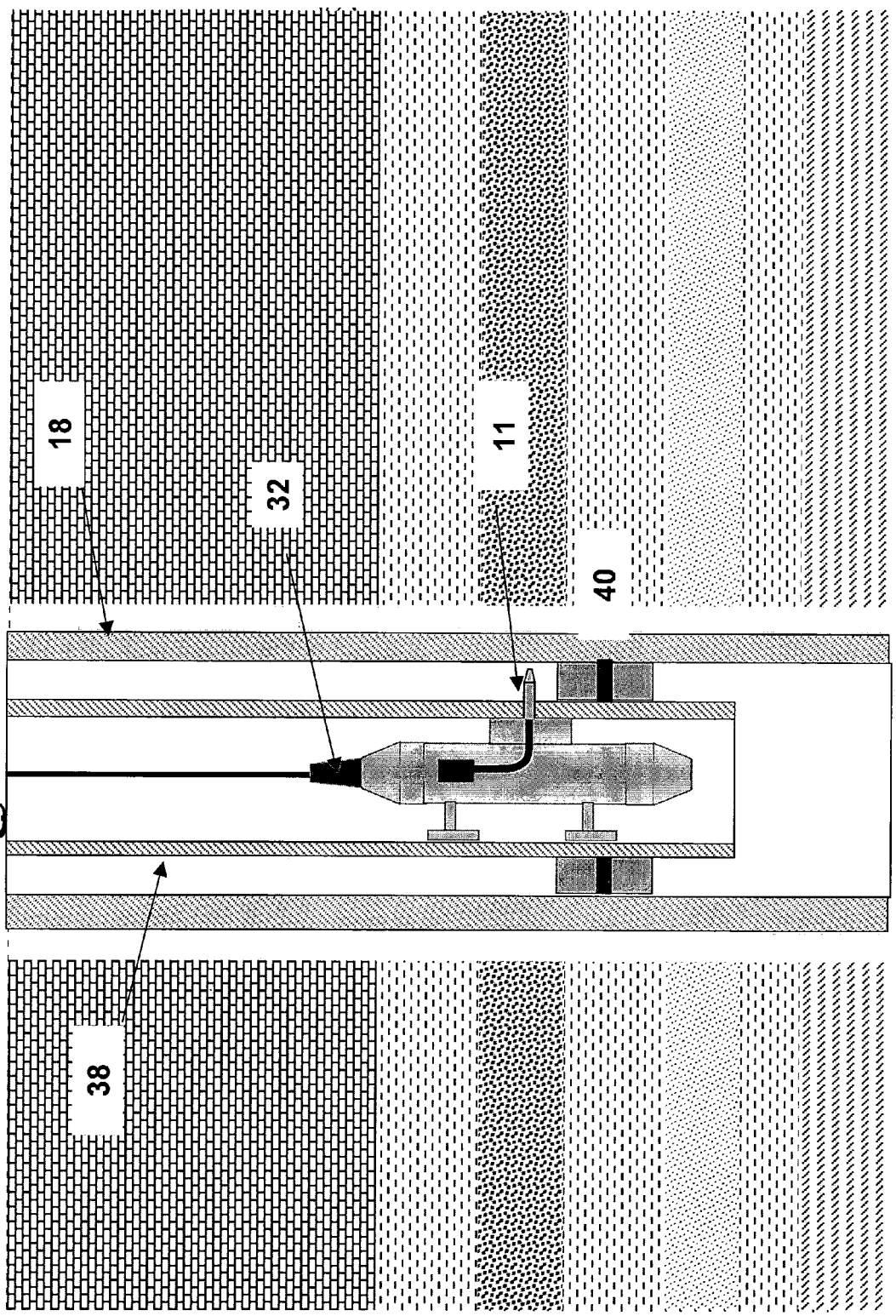
FIG. 5 shows a wireline tool for plug deployment in production tubing.

In producing wells, the upper part of the well above the producing zones is typically completed with production tubing 38 inside the casing 18. The production tubing 38 runs from a packer 40 at its lower end to the surface, forming an annular space 42 between the outer surface of the tubing 38 and the inner surface of the casing 18. Production tubing is usually made from steel. In this configuration, the plug 11 is inserted into the tubing 38 using the technique described in US 2002/0195247. A carrying tool 32 is deployed in the tubing 38 and positioned at the targeted depth for drilling a small diameter micro-hole into the tubing wall, as is shown in FIG. 5. In this configuration, the plug 11 can be used to measure annular fluid properties such as pressure.

The basic functions to be implemented within the smart plug are as follows:
Sensors 12, interface 44 and signal conditioning 46
Analog-to-digital converter 48
Memory and micro-controller unit 50
Short-distance wireless transmission/reception 52
Embedded power generation from antenna received signals 54.

Figure 6:
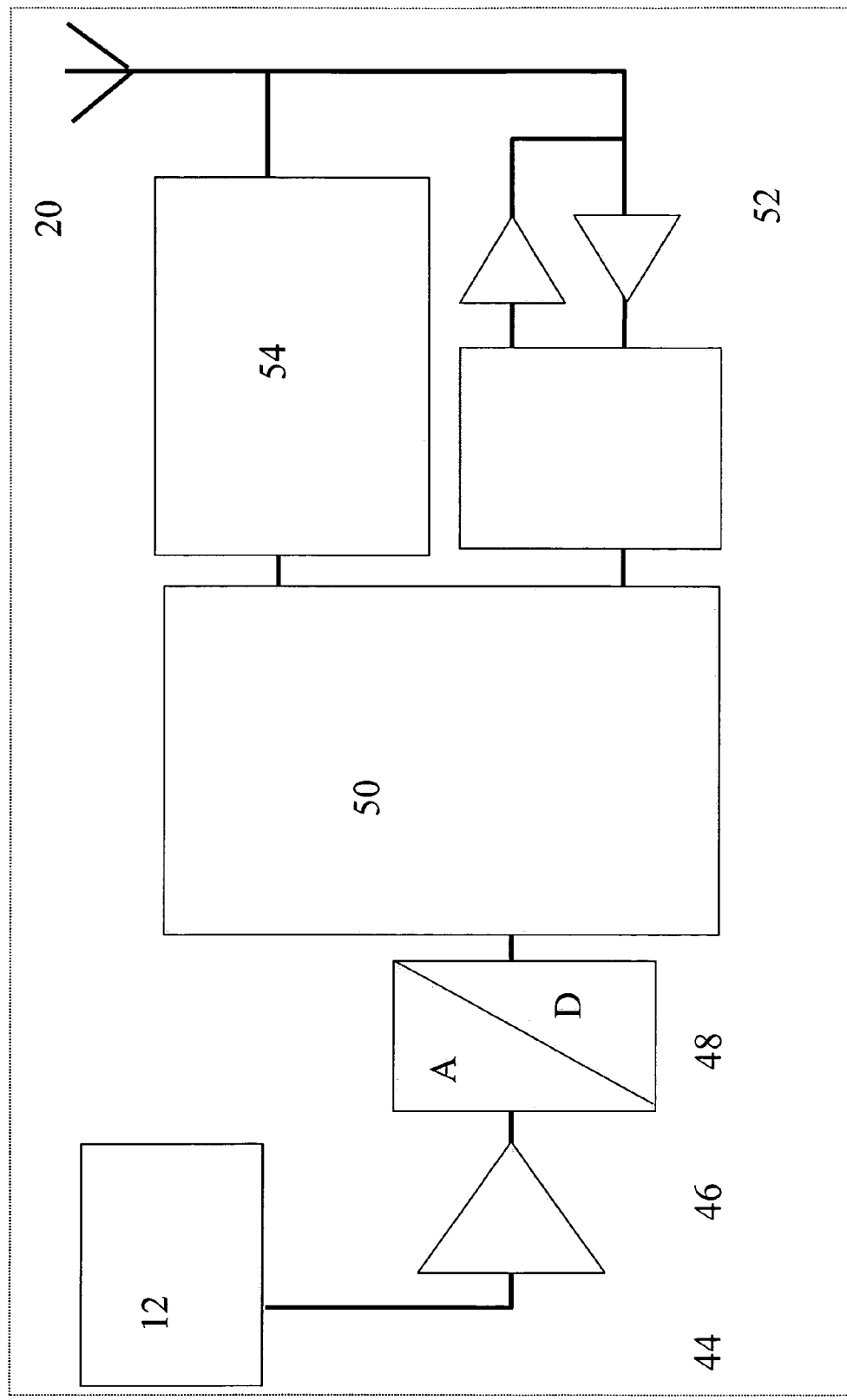
FIG. 6 shows an overview of the basic electronic functions in a plug.

An example of an electronic diagram for achieving these functions is shown on FIG. 6.

By using very low power electronics, the requirements in term of electrical consumption will be extremely small, allowing activation of the plug via a wire-less system. The power supply is recovered from the antenna 20 by electro-magnetic coupling with a nearby wireline tool and DC converted 54 to power the different circuits.

The sensor signal is amplified 46 and sent to the ADC 48 for digitization and time sampling. If required, the embedded micro-controller 50 can apply downhole processing before saving the data in its internal memory.

The low power micro-controller 50 schedules the electronics tasks and controls the acquisition and data transmission. Upon a request made by the wireline tool 22, the data emission is initiated and the coded signals are sent to the local antenna driver 52. In this example, the short-range wireless link is based on EM transmission and ensures data communication and power transfer between the logging tool 22 and each sensing unit 11.

Figure 7:
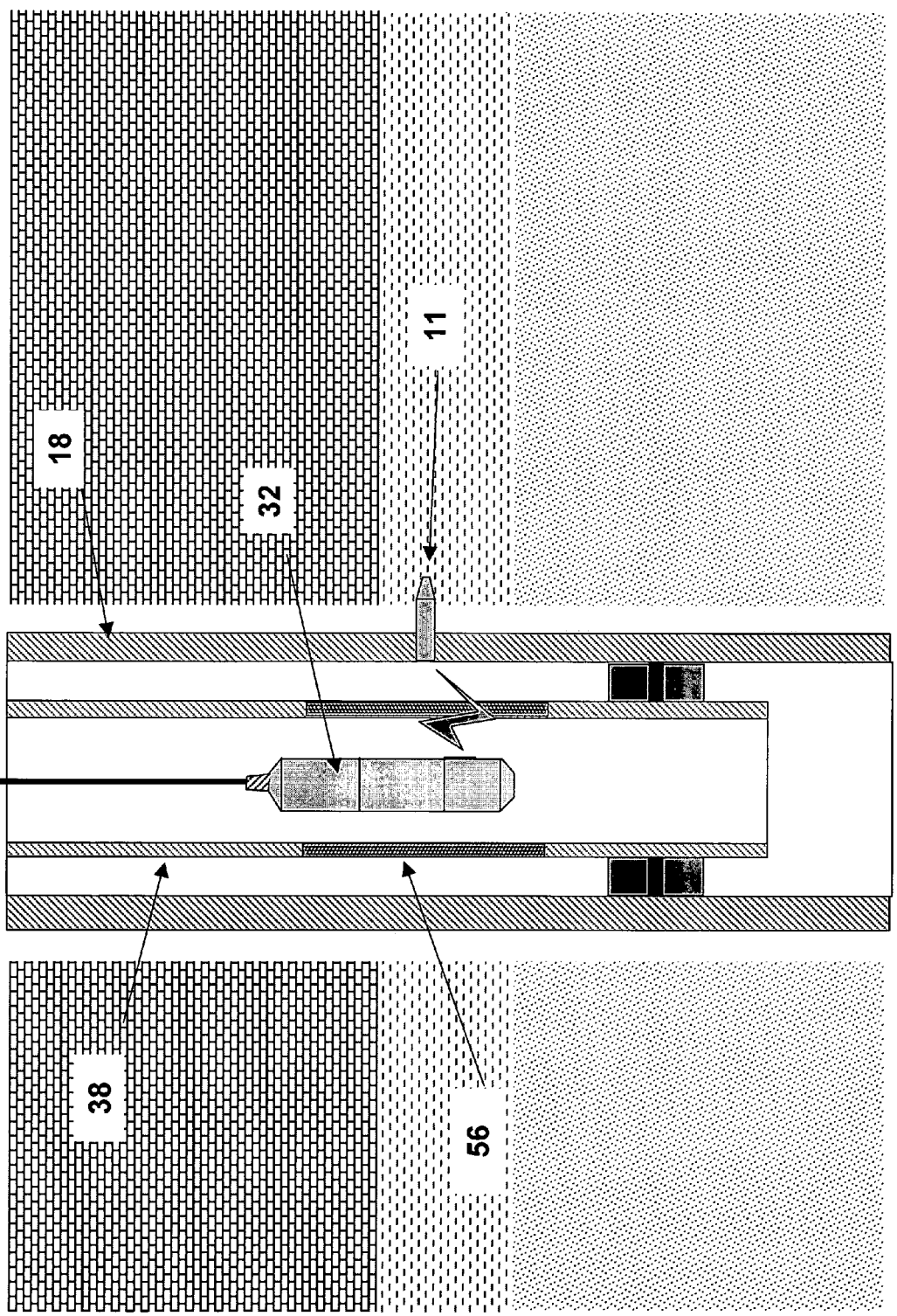
FIG. 7 shows deployment and interrogation of plugs behind production tubing.

For some completion scenarios, such as the one shown in FIG. 7, production tubing 38 is deployed inside the casing 18 at the plug level. In order to achieve a communication link between the wireline tool 22 and the plug 11, it is proposed to place a tubing section formed with non-conductive material 56 proximate the plug depth. This tubing section will allow electro-magnetic signals to pass through it in order to communicate and power the sensor plug 11.

The tubing section 56 can be formed with non-conductive and durable materials such as epoxy or composite material. A short section of pipe made with glass-fiber reinforced epoxy will allow through-tubing plug interrogation while preserving the integrity of the production string, particularly for a well environment that is not too sever in terms of temperature and pressure ratings.

Figure 8:
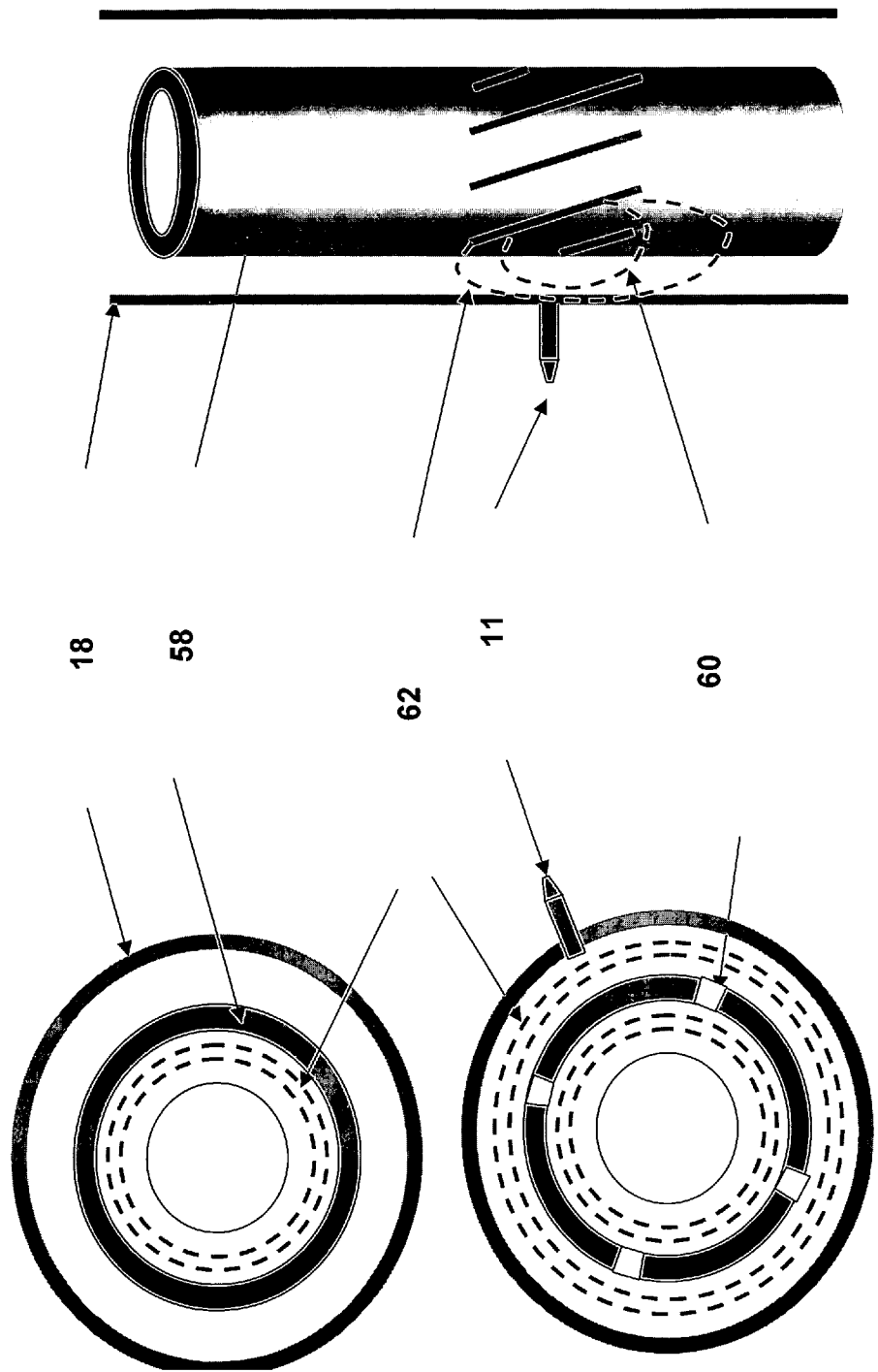
FIG. 8 shows signal transmission patterns through slotted tubing.

In an alternate design, the tubing 38 consists of a steel pipe 58 with slotted sections 60 filled with non-conductive material such as epoxy. This technique is described in US 2003/0137429 (incorporated herein by reference). The slots can be manufactured with a tilt angle from the tubing axis in order to provide a full coverage azimuthally as is shown in FIG. 8. The EM antenna field 62 is confined within the tubing 38 in the solid section, but extends outside the tubing 38 in the slotted section 60. This design permits through-tubing signal transmission or reception with a high efficiency. If the slots are reinforced with material such as fiberglass epoxy or ceramics, this will allow higher pressure rating than a pure epoxy section.

Figure 9:
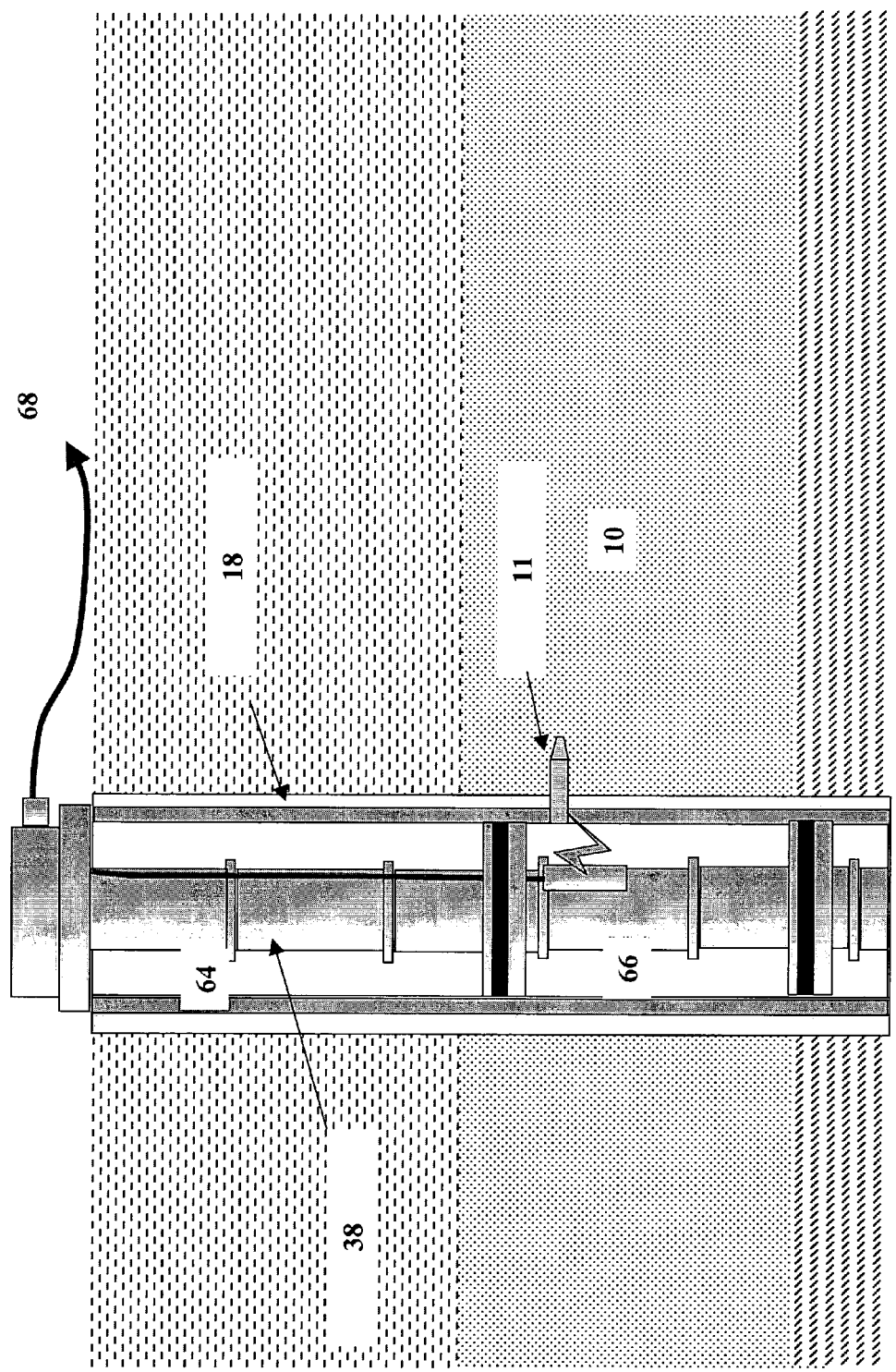
FIG. 9 shows plug deployment with a permanent communication tool.

An installation with a fixed interrogation tool is shown in FIG. 9. In this configuration, the interrogating tool 64 is permanently deployed with the production tubing 38 proximate the remote sensors location 11. The interrogating tool 64 is mounted outside the tubing 38 and run with it into the hole. This interrogating tool 64 is deployed in a permanent fashion and removed with the tubing completion 38. A communication and power cable 66 is clamped along the tubing to ensure the link with the surface equipment 68. The tool 64 is equipped with an antenna to communicate in a wireless mode with the plug 11, to control its function and collect the measured data. The wireless communication between the plug 11 and the interrogating tool 64 can be ensured via EM or acoustic coupling.

The data are sent up hole to a surface computer 68 by the tubing cable 66 for later analysis. No battery is required as the wireless power transfer is made in a continuous fashion from the permanent sonde 64 deployed along the production tubing 38.

Various types of sensors and technology can be implemented in this invention. Such sensors can, for example, measure the surrounding formation fluid pressure, resistivity, salinity or detect the presence of chemical components such as $CO_2$ or $H_2S$. The invention can also be applied to casing or tubing sensors such as those measuring strain and stress. In this case, the plug can be equipped with a miniaturized strain gauge to detect any deformation of the completion pipe (casing or tubing). For example, the following types of sensors can be implemented:

Pressure and temperature.
Resistivity (or conductivity).
Casing and Tubing stress or strain.
pH of surrounding fluids.
Chemical content such as $CO_2$ and $H_2S$ monitoring.

As opposed to sensors located in the borehole fluids such as in conventional logging or well monitoring, the sensors are in direct contact with the formation and insulated from the borehole fluids. This feature allows direct measurement of formation properties with minimum interaction with borehole fluids.

For fluid pressure measurement, the plug is equipped with a pressure sensor 70 and dedicated electronics 72. As opposed to pressure sensors located in the borehole fluids such as in conventional logging or well monitoring, the sensors are in direct pressure contact with the formation fluids. The advantages for placing the sensor in such direct contact with the reservoir formation fluids are numerous:

Uncertainties for extrapolating reservoir pressure from a tubing gauge are eliminated.
Formation pressure transients are not affected by fluid flow in the production tubing.
Monitoring of shallower zone by a well with deeper completions becomes feasible.
It allows direct measurement of reservoir pressure even in non-producing zone (cases where the casing is not perforated as the zone is not producing).
Monitoring of individual reservoir pressures in stacked reservoir is achievable.

An example of pressure sensor integration in the sensor plug is shown in FIG. 9. At the plug head, the small dimension pressure sensor 70 is placed inside a protective and coupling mechanism such as a flexible bellows 74. This mechanism ensures insulation from corrosive fluids while preserving high sensitivity of the measurement to external pressure variations. A small dimension port 76 ensures the communication between a pressure chamber 78 and the formation fluids. A permeable material can advantageously be placed inside the port to avoid entrance of sand particles inside the chamber and deposit on the surface of the bellows 74.

The plug sealing in the casing wall is a key element as any leakage will affect the integrity of the casing and might also lead to a misinterpretation of the pressure measurement. It is required that the sensor is coupled to the formation fluid pressure. The sensor must be insulated from pressure variations inside the casing. This is an advantage of the proposed technique compared to classical pressure measurement with a borehole logging sonde that is sensitive to borehole fluid effects.

Various techniques for pressure sensing can be applied. For example, the pressure sensor can comprise a strain gauge deposited on a membrane frame. In this case, the pressure is classically obtained by measuring the variations of a resistances network mounted on the membrane.

Resistivity sensors are of interest to identify the fluid type and differentiate water from oil and gas. One suitable technique relates to a laterolog-type measurement. This type of measurement is based on the use of a set of electrodes for current injection and voltage measurement. In a classical four electrode configuration, if I notes the current injected between two electrodes and $\Delta V$ the measured differential voltage between the two measurement electrodes, the formation resistivity Rt is estimated using the classical impedance formulation: $Rt=Kf*\Delta V/I$; where Kf is a geometrical factor that depends on the plug geometry and electrode disposal.

Figure 10:
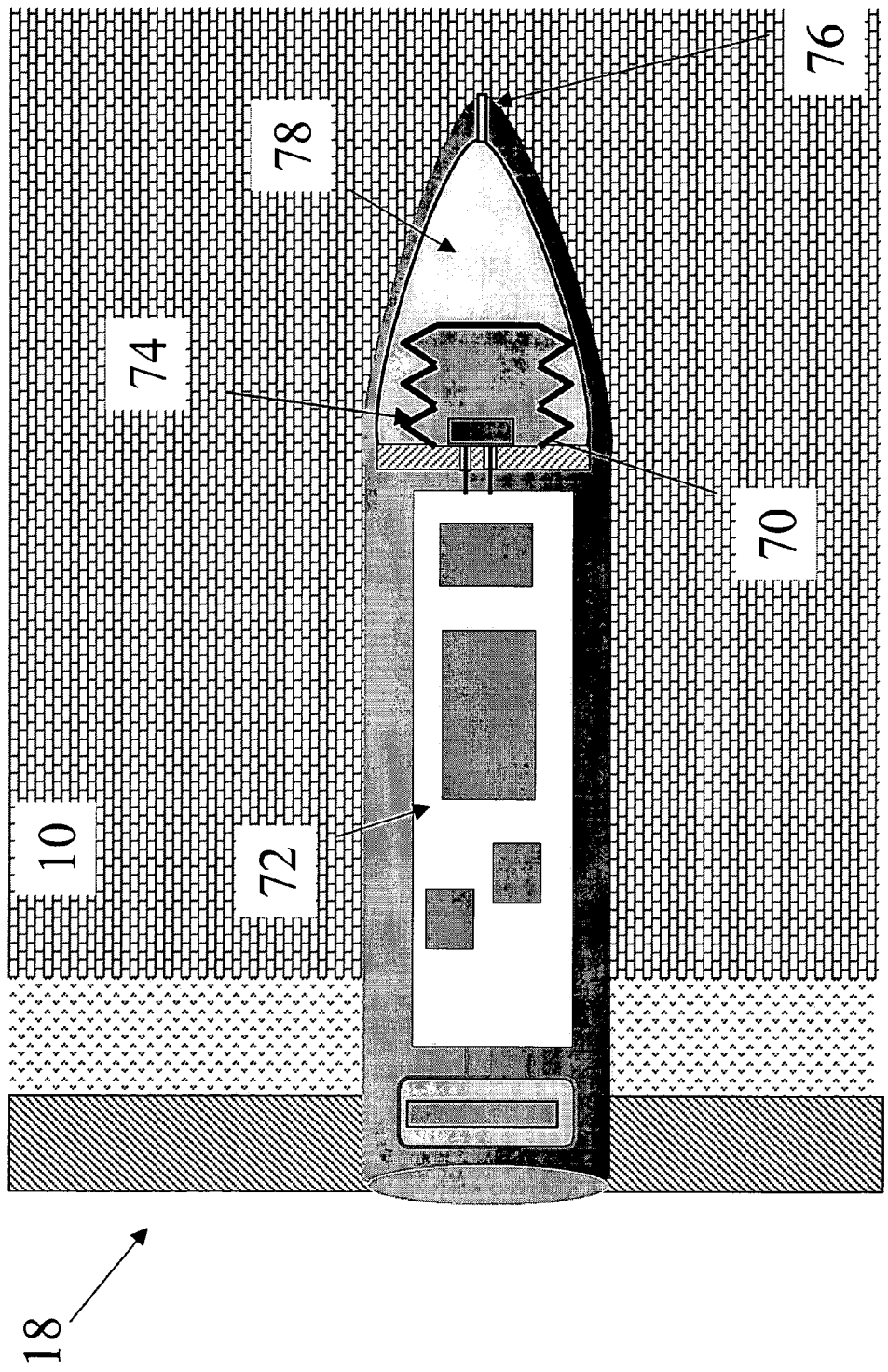
FIG. 10 shows a pressure sensor plug.
Figure 11:
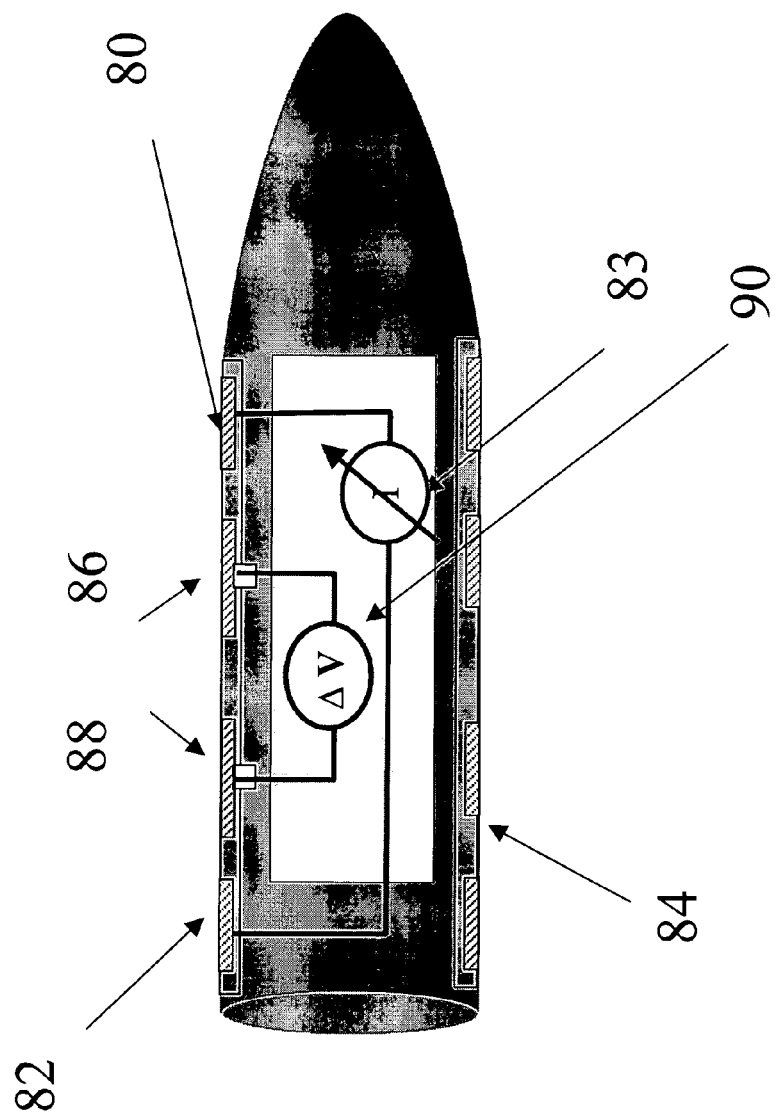
FIG. 11 shows a resistivity laterolog plug.

An example of a sensor plug with a four-electrode configuration is shown in FIG. 10. In this configuration, current injection electrodes 80, 82 are provided at the top and bottom of the plug and connected to a current generator 83. The plug main housing is externally coated with insulated material 84 such as ceramic or coating and electrically insulated from the electrodes. The excitation signal is a low frequency current I injected into the formation fluids by the embedded plug AC generator 83. The frequency is in the order of a few Hz up to a few kHz. The voltage $\Delta V$ between the two measurement electrodes 86, 88 mounted between the current injection electrodes is acquired by the plug electronics 90.

Figure 12:
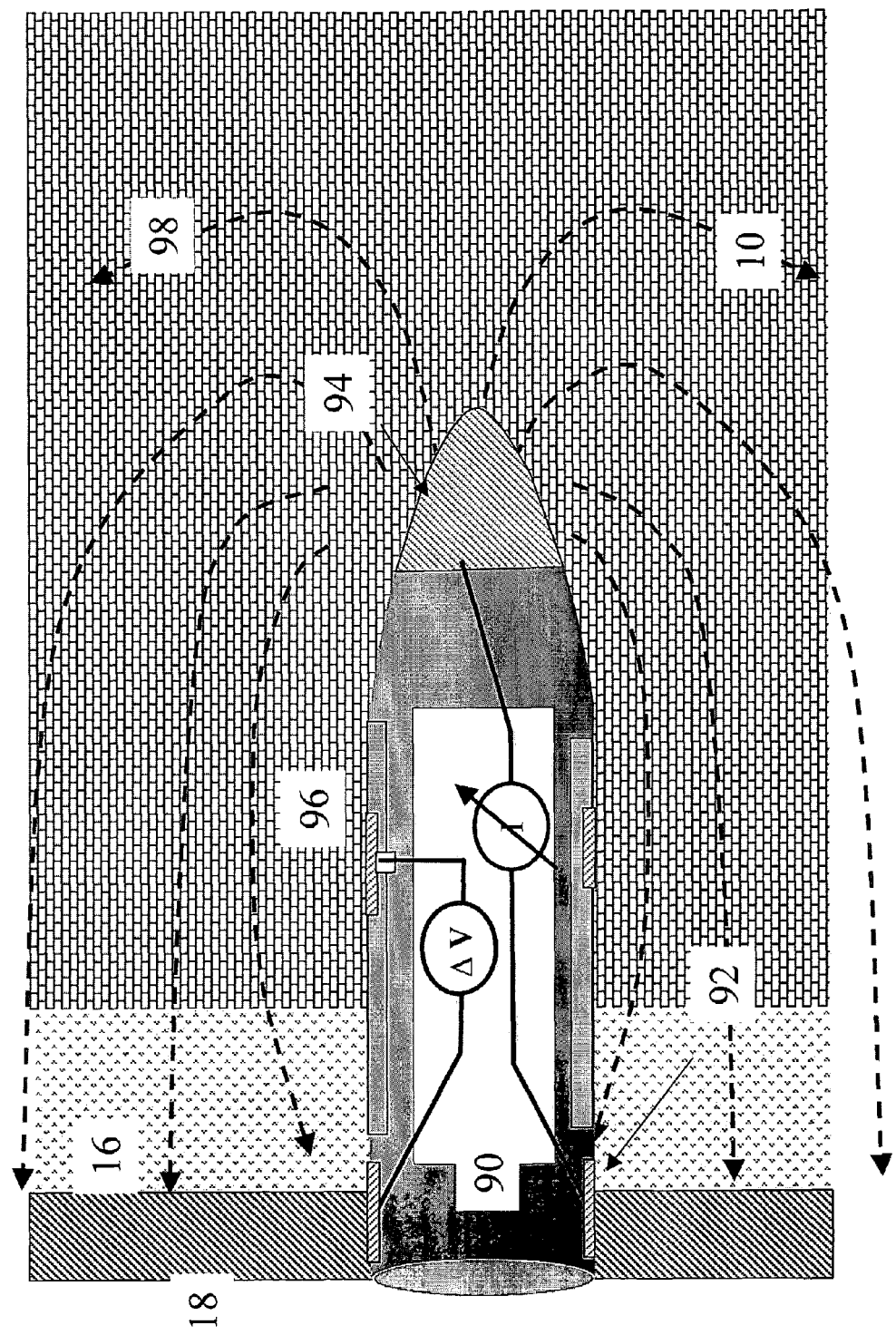
FIG. 12 shows a second embodiment of a resistivity laterolog plug.

Another configuration using the casing as reference electrode is shown FIG. 12. This configuration requires only three electrodes. The bottom end 92 of the plug that is sealed into the casing 18 is used as return electrode for both current injection and voltage measurement. The current emitting electrode can be located at the top extremity of the plug 94. One measurement electrode 96 is mounted on the outside of the plug housing and connected to the internal plug electronics 90.

As the casing 18 is metallic with a very high conductivity and having a large vertical and lateral extension, its impedance is very low allowing injecting a high current level. Also, due to its very high conductivity, the casing surface remains at the same constant potential, as a first approximation. Consequently, it presence modifies the current lines distribution 98 by leading to a deeper penetration of current into the formation 10 as shown in FIG. 12. The current flows from the emitting electrode 94 towards the casing surface 18, the current lines 98 being orthogonal to the casing surface. In this configuration, the casing electrode 92 is used as reference for the voltage measurement and as return for the current emission.

In case of presence of oil inside the drilled hole, it is important to ensure electrical contact between the emitting electrode and the surrounding formation or formation fluids. Having a mechanical contact via a miniaturized spring bows between the electrodes and the formation rocks ensures this. This contact ensures electrical contact with the formation in case of oil inside the hole.

Figure 13:
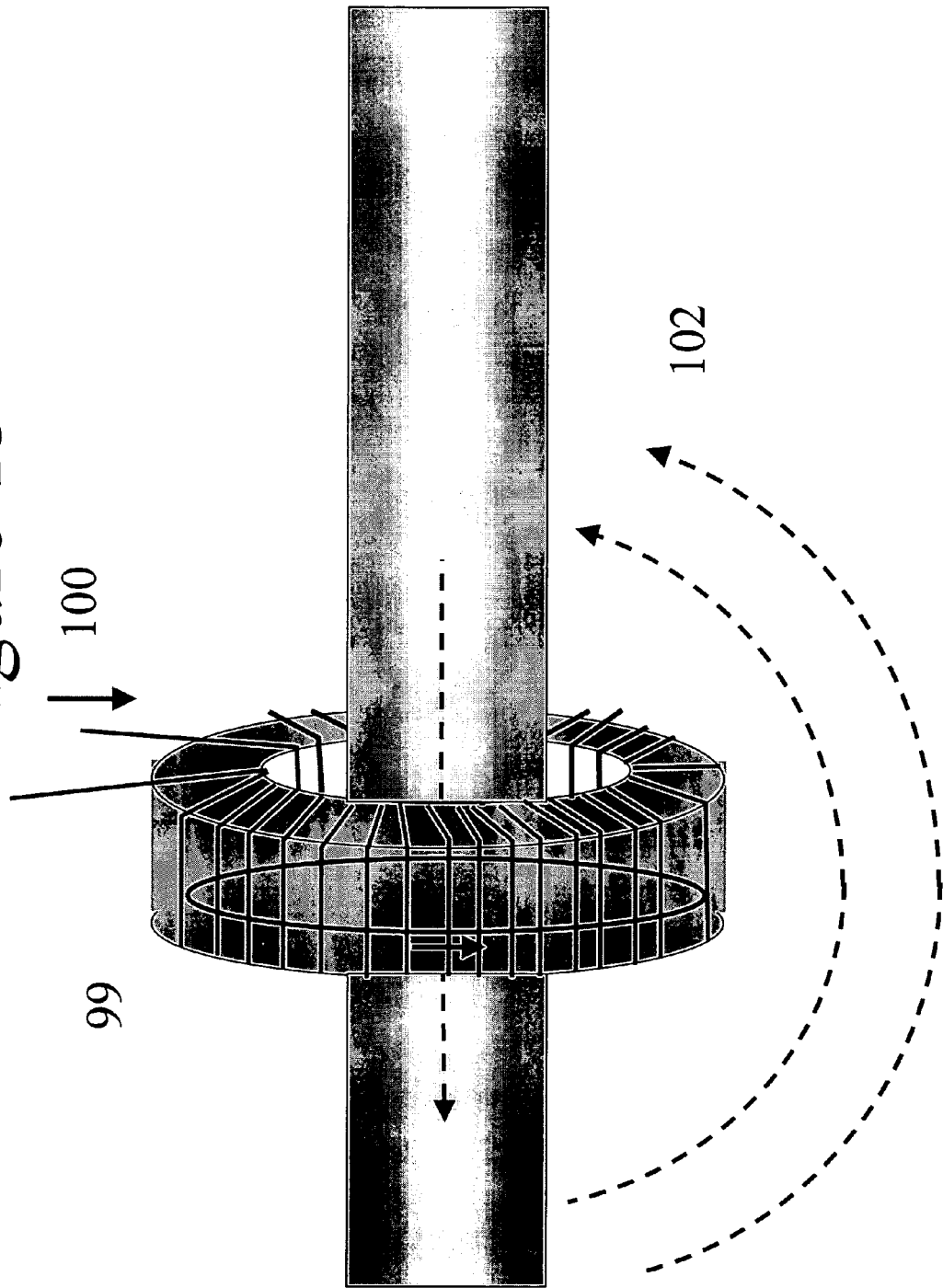
FIG. 13 shows the principle for a toroidal antenna.

A different technique is based on toroidal antennae to measure the formation impedance. The toroidal antenna 99 is mounted around the plug housing. The antenna principle is shown in FIG. 13.

Figure 14:
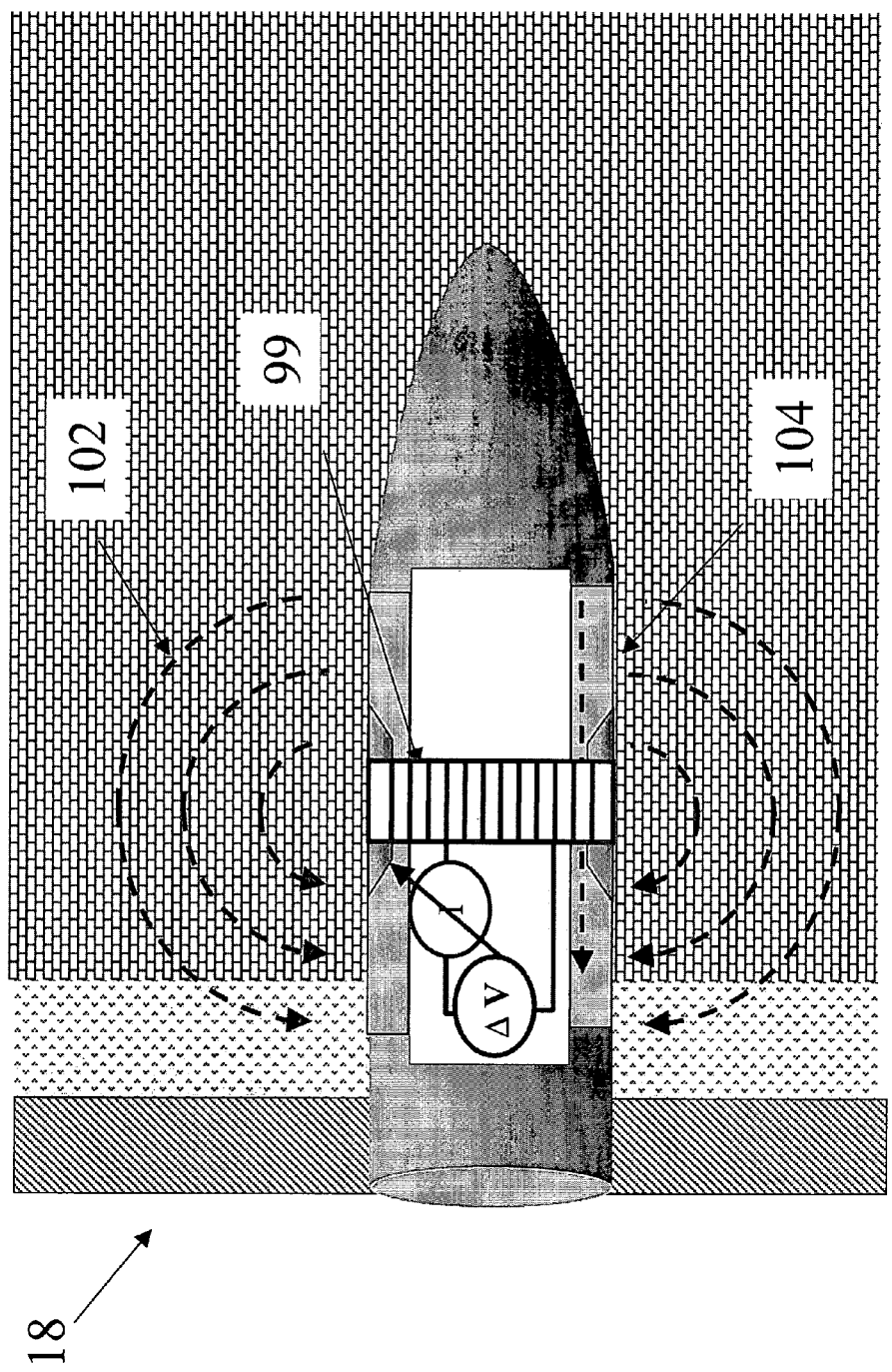
FIG. 14 shows a resistivity plug based in impedance measurement with a toroidal antenna.

When excited by an AC voltage generator 100, current lines 102 are induced into the surrounding formation. The frequency range is on the order of ten to a few hundred of kHz. Any variation of the formation resistivity modifies the excitation current and voltage. Therefore, the impedance of the toroidal antenna 99 depends upon the resistivity of the surrounding formation. As shown in FIG. 14, the metallic external surface 104 of the plug housing is acting as an electrode and radiates current 102 into the formation. By measuring the antenna impedance during current injection, it is possible to estimate the average formation resistivity.

Figure 15:
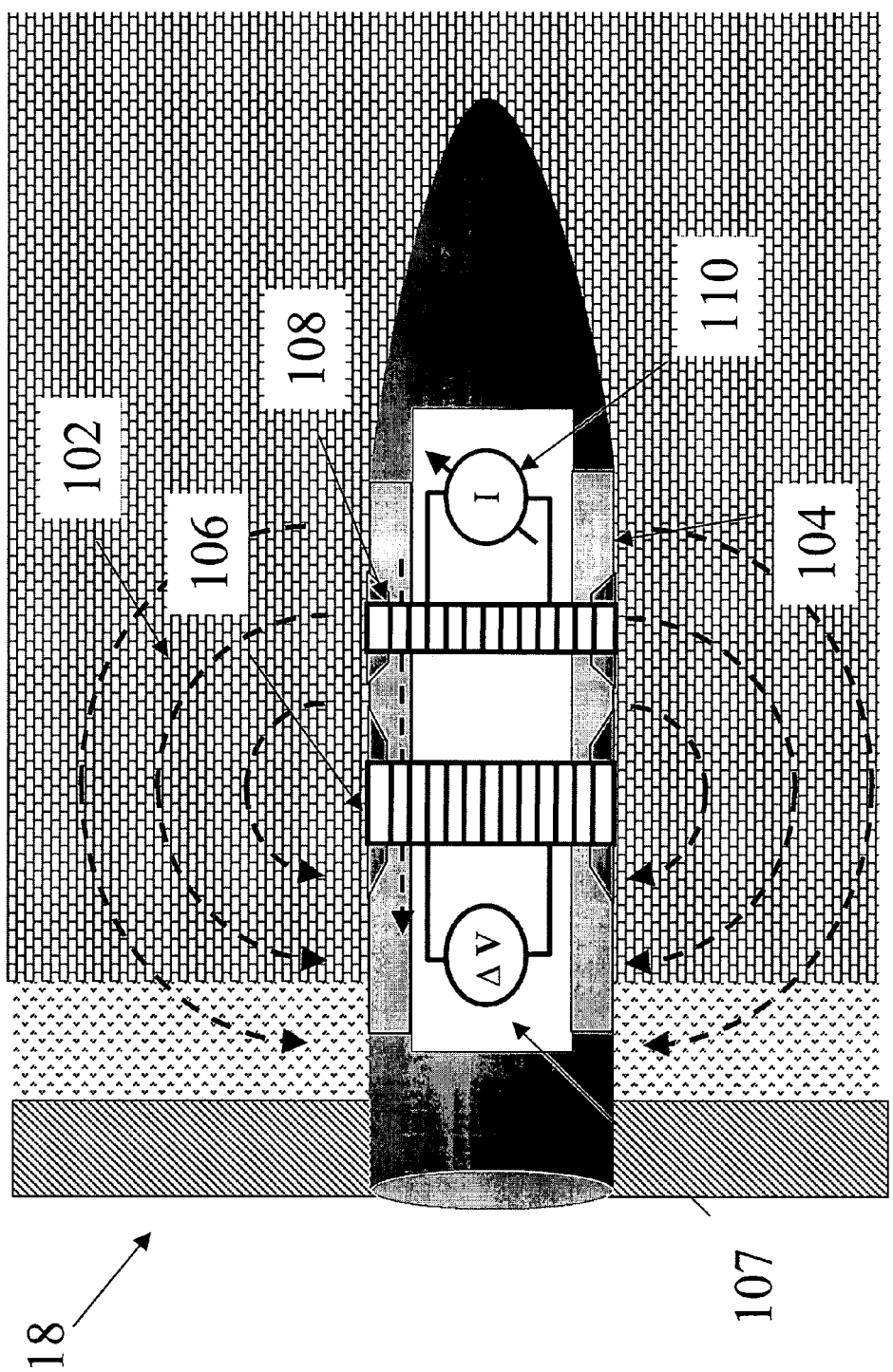
FIG. 15 shows a second embodiment of a resistivity plug based in impedance measurement with a toroidal antenna.

This technique can be extended to a set of two toroidal antennae, one antenna 106 connected to a voltage generator 107 acting as emitter, the second one 108 connected to a current monitor 110 acting as formation current monitor. The principle is shown in FIG. 15. The formation impedance is directly proportional to the ratio between the antenna voltage and the monitored current: Rt=Kf*ΔV/I; where Kf is a geometrical factor that depends on the plug geometry and toroidal antennae disposal.

Figure 16:
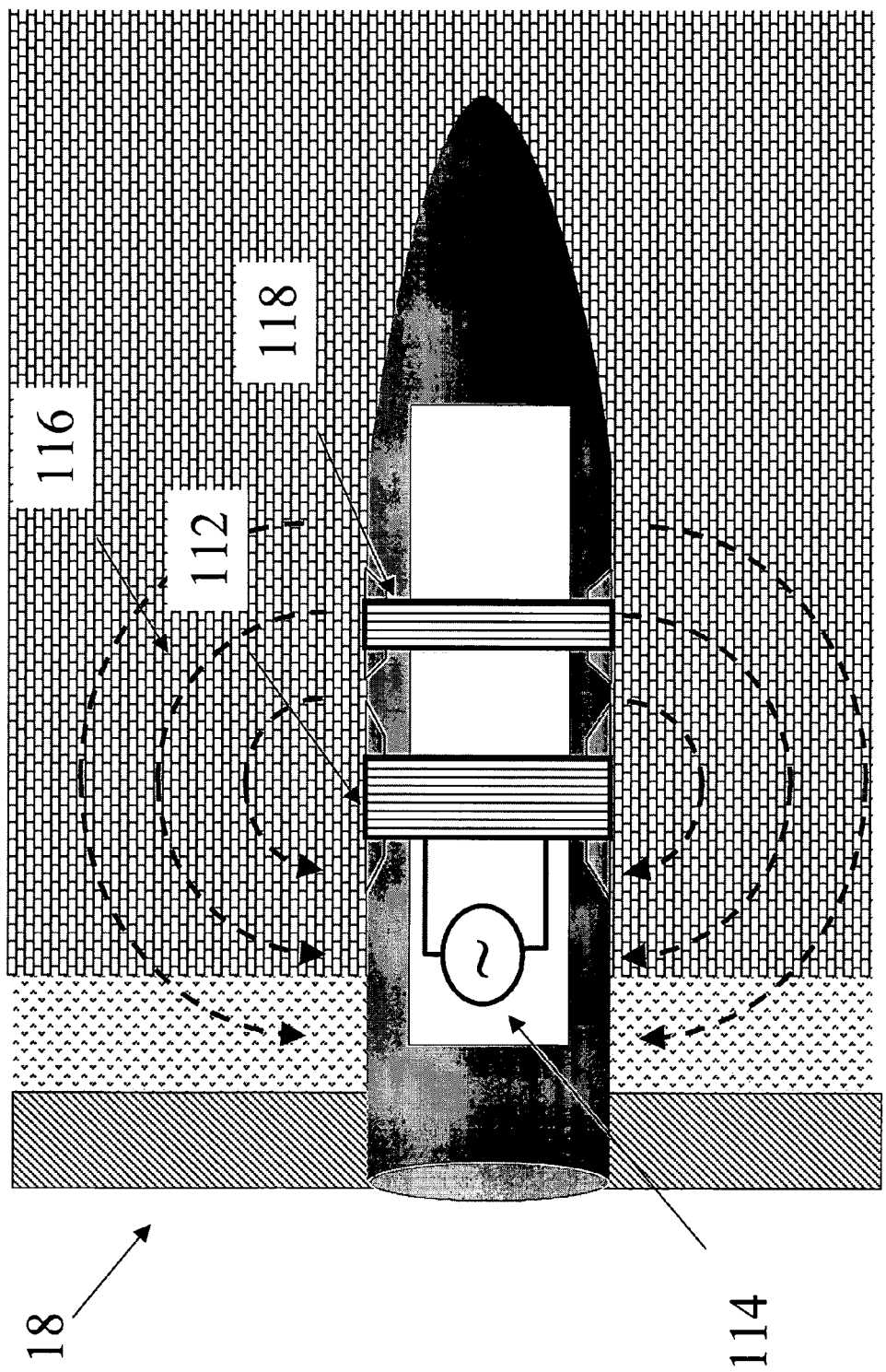
FIG. 16 shows a resistivity plug based on an induction principle.

In another embodiment of the invention, the formation fluid resistivity is measured with an induction-based technique. The plug is equipped with at least one coil antenna to measure the formation electrical impedance. The principle for a two coil system is shown in FIG. 16.

The inductive source comprises a multi-turn coil 112 excited by a time-varying signal source 114 that generates electromagnetic field 116 into the formation. The source coil 112 is excited by a high frequency voltage signal. The coil dimensions are small compared to the wavelength (low frequency approximation) so that the coil 112 acts as a magnetic dipole source. If the excitation current level is I and the equivalent coil area $A_T$, the source strength is given by its dipole moment:

$$M = I.A_T \text{ [Amp][m]}^2;$$

At reception, the coil sensor 118 detects the magnetic flux time-derivative. In a homogeneous medium, the magnetic field has two components, one component is in phase with the source current excitation, and the other component is in quadrature phase. Its expression can be written:

$$B = \frac{M\mu}{2\pi r^3}(1 - ikr)\exp(ikr)$$

where k is the wavenumber in the surrounding medium. Within the low frequency approximation, we have $k^2 = i\omega\mu\sigma$.

The low frequency approximation is valid as soon as:

$$\varepsilon << \frac{\sigma}{\omega}$$

where σ notes the medium conductivity and ε is the electrical permitivity. The coil separation is r and the two coils are aligned. The coil spacing must be compared to the skin depth given by:

$$\delta = \sqrt{\frac{2}{\omega\mu\sigma}}$$

If the coil spacing r is small compared to the skin depth δ, (r<<δ), the low frequency approximation can be used and the real and imaginary magnetic field at distance r, respectively the in phase and quadrature components are given by:

$$\text{Re}(B) = \frac{M\mu}{2\pi r^3}\left(1 - \frac{r^3}{3\sqrt{2}}(\omega\mu\sigma)^{3/2}\right)$$

$$\text{Im}(B) = \frac{M\mu}{2\pi}\left(\frac{\omega\mu\sigma}{2\pi r} + \frac{1}{3\sqrt{2}}\right)(\omega\mu\sigma)^{3/2}$$

In a first approximation, the quadrature signal is proportional to the formation conductivity. The formation conductivity is obtained by the ratio of the in phase and quadrature components;

$$\sigma = 2\frac{\text{Im}(B)}{\text{Re}(B)}\left(\frac{1}{r^2\omega\mu}\right)$$

The working frequency is selected by design according to the plug dimension and targeted formation resistivity. As example, for a 4 cm spacing between coils and a resistivity range between 0.1 and 1000 Ohm·m, the upper limit for the low frequency approximation is 1 Mhz. Due to skin depth effect, the depth of investigation into the formation is decreasing as the frequency increases and as the resistivity decreases. To increase the investigation depth, the frequency range will be in the order of a few 100 kHz, in the considered resistivity range.

The presence of the casing 18, which is a highly conductive material in the close vicinity of the plug, will affect the measurement. However, if the source coil 112 is close to the casing 18, the casing 18 will act as a reflector and enhance the emitter strength. The coil receiver response will be mainly dependant upon the formation resistivity.

The advantage of the technique compared to the laterolog principle is that it better applies in case of non-conductive fluids such as oil in the micro-hole. This can be a more efficient system in front of hydrocarbon-saturated zone.

Figure 17:
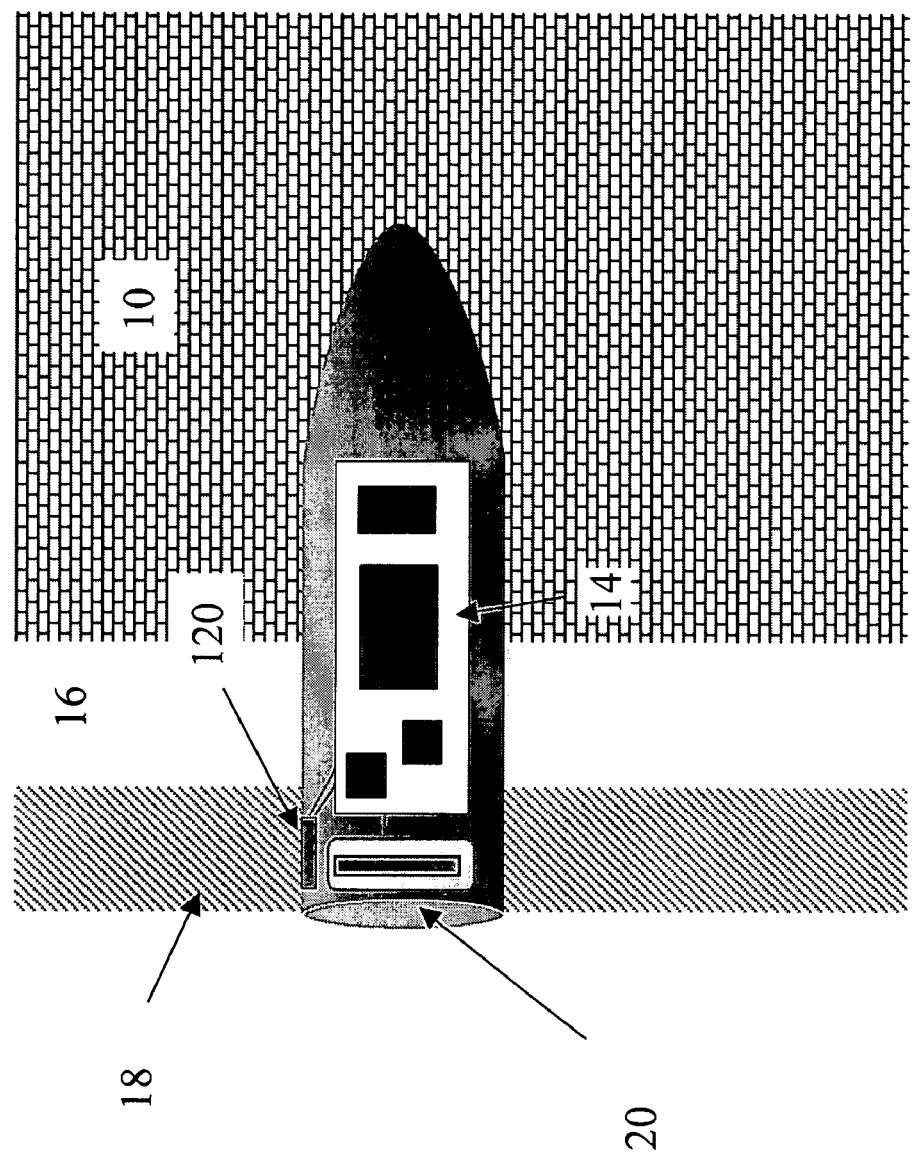
FIG. 17 shows a plug with a strain gauge sensor to measure casing deformation.

For a casing stress and strain measurement application, the plug 11 is equipped with a strain gauge 120 that allows evaluating the casing deformation and stress. The strain gauge 120 is mounted on the inside of the plug housing, close to the section that is sealed to the casing 18, as shown on FIG. 17. Therefore, the strain gauge 120 will be sensitive to any deformation of the casing 18. The strain gauge sensor 120 can be oriented in order to measure vertical or tangential deformation of the casing 18. This configuration may be of specific importance to anticipate any collapse of the casing, especially in case of an active fault.

Systems according to the invention can be used to monitor formation properties in various domains, such as:
  Oil and Gas Exploration and Production,
  Water storage,
  Gas Storage,
  Waste underground disposal (chemical and nuclear)

Figure 18:
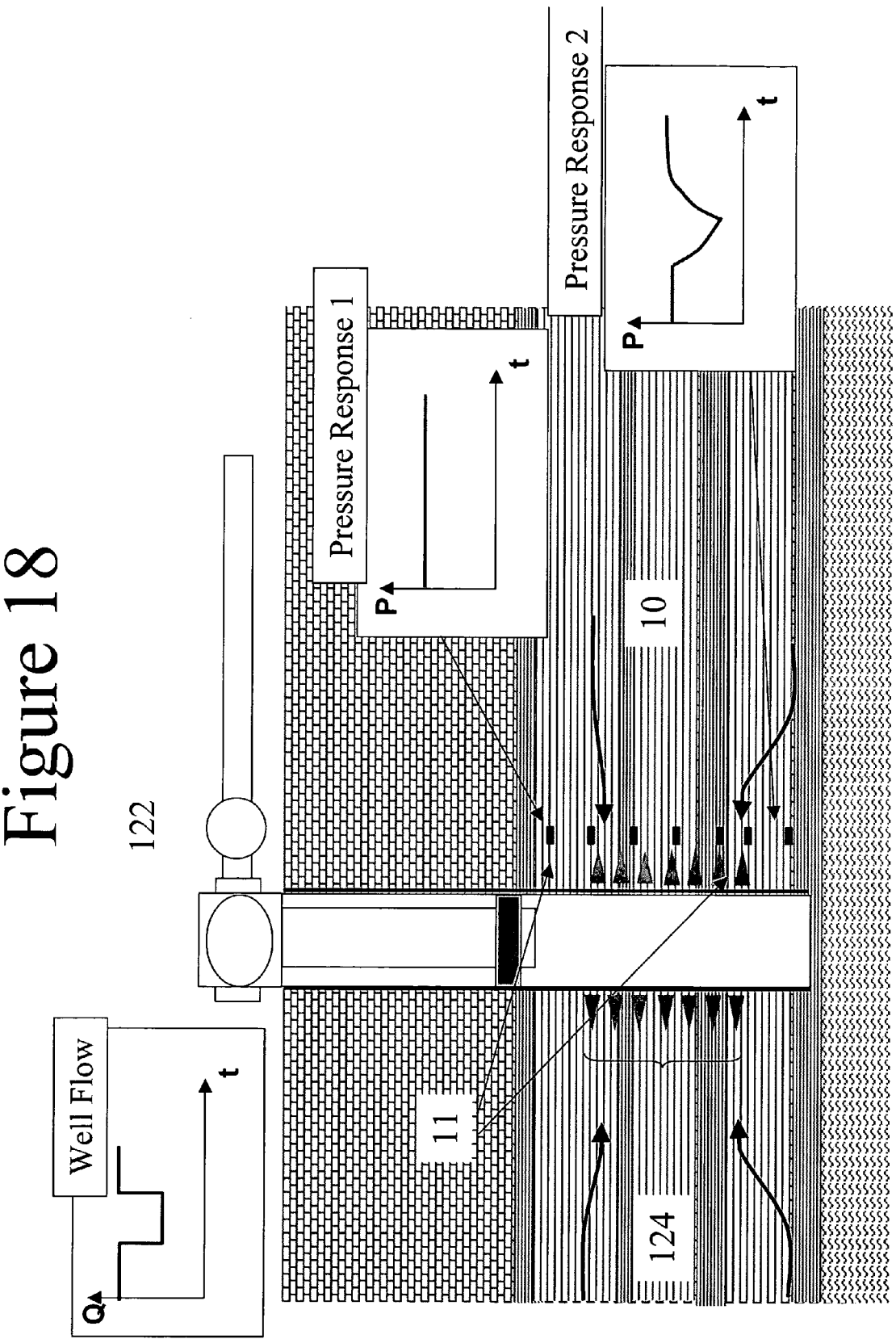
FIG. 18 shows a system for pressure monitoring in a laminated reservoir.

To monitor pressure development in layers formations, such as layered sands, several pressure-measurement plugs 11 are placed in a producer well 122 that has been previously drilled and cased. As shown in FIG. 18, the plugs are deployed along the whole reservoir section 10, at the perforated zone 124, above and below.

When the well flow rate Q is modified, the pressure in the layers will vary. In case of a low vertical permeability such as encountered in laminated sands reservoirs, the non-perforated sections above and below the perforations are expected to have a low production. The reason is that the flow is mostly radial and the vertical cross-flow is very weak due to the layering.

Monitoring a constant pressure within a layer while the well flow is varying is a clear indicator of a low contribution of such layer to the overall well production. The pressure transient recording will be of type Pressure Response 1 as shown in FIG. 18. In a layer that contributes to the well production, the pressure response will vary as the well flow is being modified. The response will be of type Pressure Response 2. Therefore, by monitoring the pressure in each layer as a function of the overall production flow, it is possible to characterize its productivity. An operator can use this information to run complementary perforations and better produce the whole reservoir section.

Figure 19:
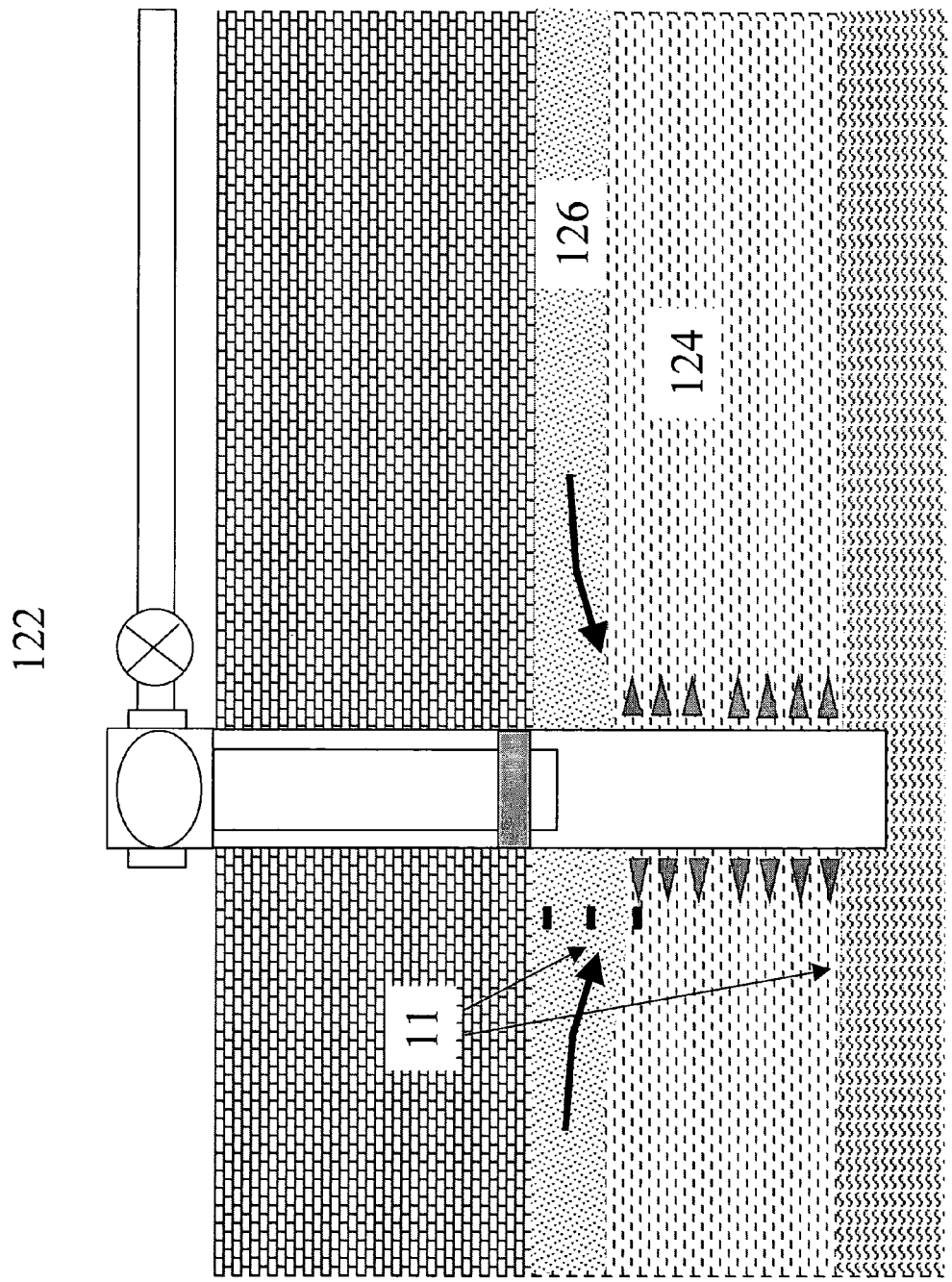
FIG. 19 shows a system for monitoring pressure gradients at the top of a reservoir section for gas coning detection.

For gas coning monitoring applications, several pressure plugs 11 (at least two) are placed above the perforated area 124 in a vertical (or close to vertical) production well 122 as is shown in FIG. 19. Each plug is equipped with a pressure sensor as described above. As the reservoir is being produced, the shape of interface between oil and gas 126 is expected to alter. This phenomenon is called gas coning as gas is displaced downwards the well-perforated zone 124 due to pressure depletion around the well. When gas reaches the perforations, it enters into the well, which consequently produces less oil. To reduce this effect, the well can be caused to produce at a lower rate so that the gas level should stay as far as possible from the perforations 124.

The objective of the pressure plug is to monitor and detect the gas coning before it reaches the perforated area. Measuring the pressure gradient between two sensor plugs located at two separated depths along the well above the perforated zone, will allow detecting a change in the formation fluids density. A decrease of the measured density will be interpreted as gas arrival. An operator can use this information to control the well choke from the surface. As a result, the gas will be stabilized above the perforations and its level is monitored. This information is obtained without removing production tubing and before gas entry in the hole.

Figure 20:
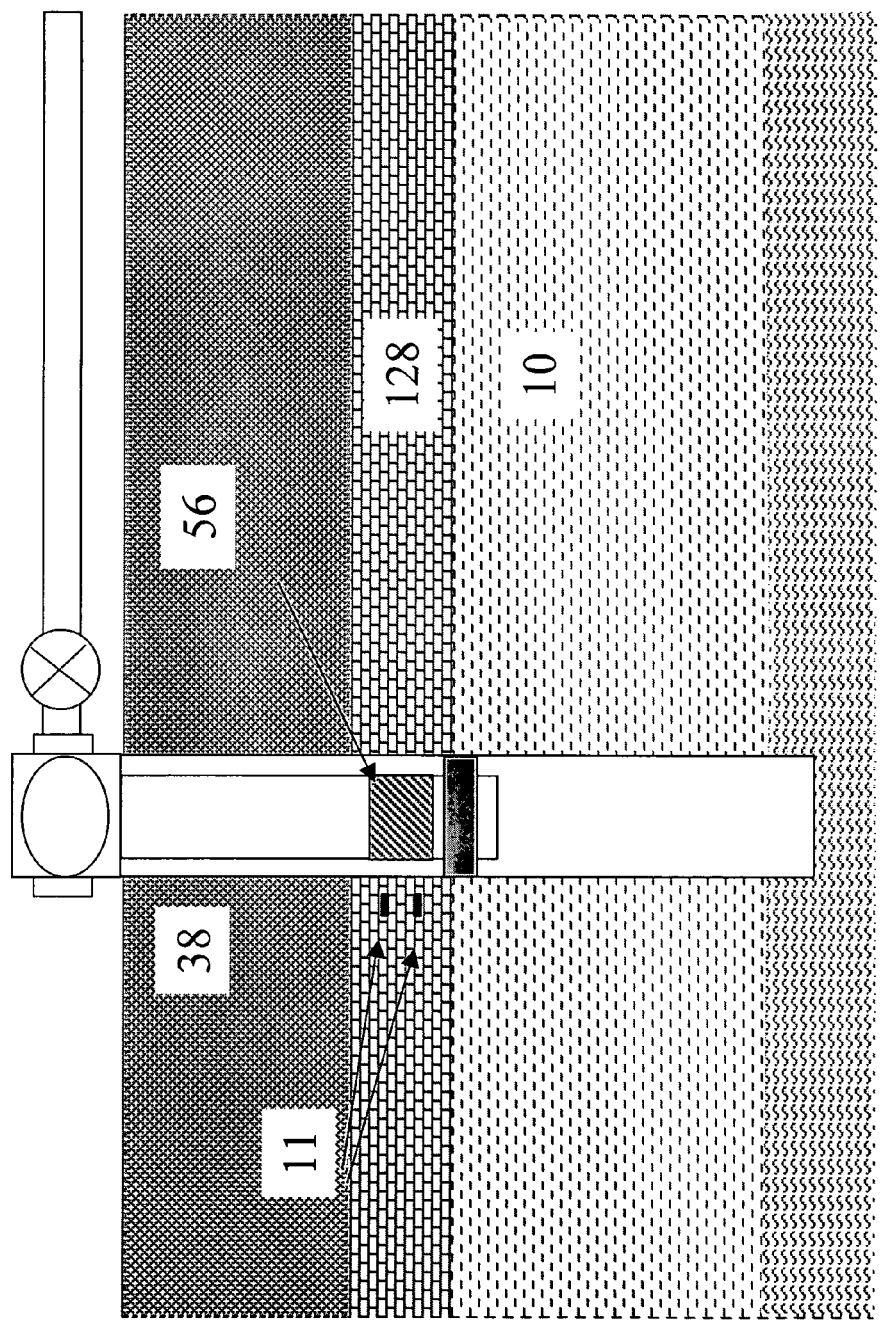
FIG. 20 shows a system for cap rock pressure monitoring.

Systems according to the invention can be used for cap rock pressure monitoring applications. An example of this application is shown in FIG. 20. The plugs 11 are placed at cap rock level 128, above the reservoir 10. The objective is to monitor its pressure and detect any leakage at cap rock level that would create fluid migration from the reservoir 10, along the well or any fractures. In this particular embodiment, a non-conductive tubing section 56 has been deployed to allow interrogating the sensor plugs 11 behind production tubing 38, as has been described above. This application is of specific interest for underground storage of gas, water and wastes (nuclear, chemicals or others . . . ) in order to monitor the cap rock integrity over long period of time. The advantage of the technique is the low impact of the smart plug deployment on the well completion design.

Figure 21:
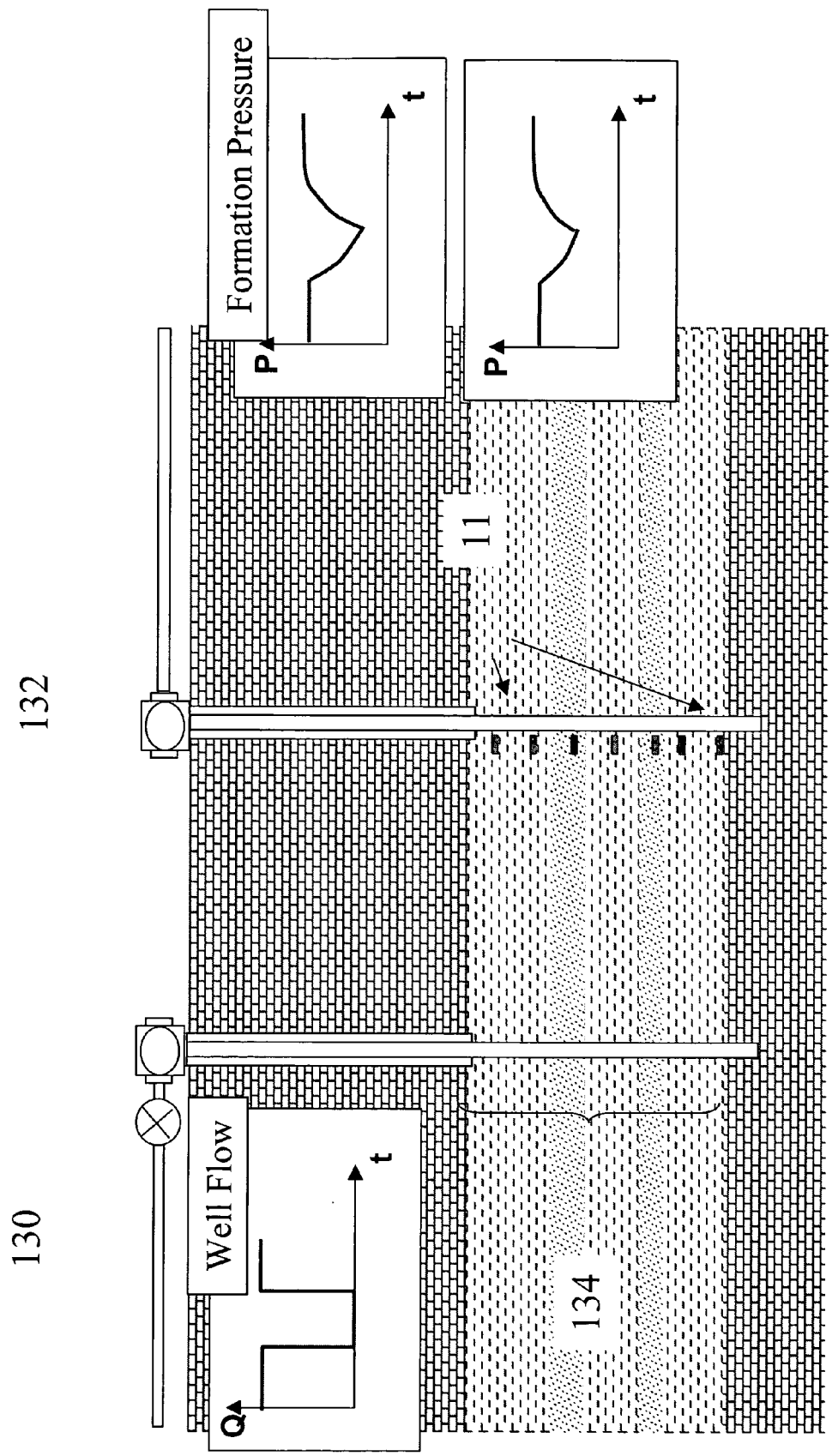
FIG. 21 shows a system for pressure-pulse tests for characterization of inter-well permeability.

A further application of the invention is transient well testing by interference test. Interference tests are classically conducted between two wells for determining the inter-well permeability. The technique consists in generating a pressure pulse in the reservoir by choking one well production, while recording the pressure transient in the nearby observation well. In this application, the observation well is equipped with an array of pressure plugs implanted in the layer stack, as shown in FIG. 21.

The pulse test consists in modifying the flow rate of the active well 130 with production and shut-in periods while measuring the distributed pressure in the observation well 132. A true pore pressure measurement is obtained in each layer 134 by the pressure plugs 11. This information is used to characterize the permeability of each layer and update the reservoir model.

Another application of the invention is in water-front monitoring. In this application, several resistivity-sensing plugs 11 are placed in a producer well 136 that has been previously drilled and cased. The plugs are deployed along the well at selected depth intervals. The injector and producer wells 138, 136 are forming a water drive cell, as shown in FIG. 22.

Each plug 11 is equipped with a resistivity sensor as described above, based on a laterolog or inductive technique. As water is being injected and displaced outside the injector 138, the shape of interface 140 between oil and water is expected to alter. The waterfront 140 is moving forward inside the reservoir rocks and is pushing the oil towards the producer 136. That results in a better drainage of the reservoir 10. Unfortunately, in case of a reservoir having heterogeneous permeability, the front advancement is non-uniform. The water will preferentially progress in layers or zones having a high permeability, whereas other layers or zones will remain non-flushed. The waterfront 140 might be heterogeneous and exhibit some fingering due to forerunners progressing faster in specific layers.

When the waterfront 140 reaches the smart plug sensors 11, variations in the formation resistivity variations will be detected. These variations are interpreted as local change of water saturation related to the waterfront arrival proximate the sensors. Time-lapse recording allows tracking the evolution of water saturation versus time and thus reconstructing the front progression inside the reservoir cell as a function of time. This information is used to update the reservoir model.

An operator can use this information to control the injection at the water well 138. A selective injection will allow an improved flushing of the producing cell. As a result, leaving less oil in place will better produce the cell.

A further application of the invention is in water-table monitoring in vertical wells using resistivity plugs. In this application, one or more resistivity sensing plugs 11 are placed below the perforated area in a vertical (or close to vertical) production well 142. Each plug 11 is equipped with a conductivity sensor as described above. As the reservoir is being produced, the shape of interface between oil 144 and water 146 is expected to alter. This phenomenon is called water coning as water is displaced towards the well-perforated zone. When water reaches the perforations 148, it enters into the well, which produces at excessive water cuts.

To reduce this effect, the well should produce at a lower rate and the water level should stay as far as possible from the perforations.

The objective of the use of resistivity plugs is to monitor and detect the rise of water table below the perforated area, as shown in FIG. 23. An operator can use this information to control the well choke from the surface. As a result, the water table will be stabilized below the perforations and its level is monitored. The advantage of the use of resistivity plugs is the ability to provide an attractive deployment in case of complicated completion such as dual production tubing 150. Dual completion is designed to allow controlled production from two separate producer zones. The production of each zone can be optimized selectively according to information collected by the resistivity plugs allowing minimizing the water entry at the level of each zone. This information is obtained without removing production tubing. This type of information can be used to more efficiently control the surface or downhole pumps and minimize the water production on surface.

It will be appreciated that these are only certain applications of the invention and that others are possible while still staying within the broad scope of this invention.

The invention claimed is:

1. A sensor for installation in an underground well having a casing or tubing installed therein, the sensor comprising:
   a sensor body that can be installed in a hole formed in the casing or tubing so as to extend between the inside and outside of the casing or tubing;
   sensor elements located within the body and capable of sensing properties of an underground formation surrounding the well; and
   communication elements located within the body and capable of communicating information between the sensor elements and a communication device in the well;
   wherein the sensor body also includes a portion that can be sealed to the casing or tubing to prevent fluid communication between the inside and the outside of the casing or tubing through the hole when the sensor body is installed therein.

2. The sensor as claimed in claim 1, further comprising an electronics package in a protective housing connecting the sensing elements and the communication elements.

3. The sensor as claimed in claim 1, wherein the communication elements comprise a transducer for electromagnetic or ultrasonic wireless communication with a communication device inside the casing.

4. The sensor as claimed in claim 3, wherein the transducer is also used to provide power to functional elements in the plug.

5. The sensor as claimed in claim 3, wherein power is provided to functional elements of the sensor by means of a battery installed in the sensor body.

6. The sensor as claimed in claim 5, wherein the battery can be recharged by power supplied from the communication device via the transducer.

7. The sensor as claimed in claim 1, wherein the electronics package comprises:
   a signal conditioning and analogue to digital conversion stage which receives data from the sensor elements;
   a micro-controller and memory unit for receiving data from the signal conditioning stage;
   a wireless transmission and reception controller; and
   a power supply stage.

8. The sensor as claimed in claim 1, wherein the sensing elements are sensitive to one or more of the following: pressure, temperature, resistivity, conductivity, stress, strain, pH and chemical composition.

9. The sensor as claimed in claim 8, comprising pressure sensing elements, the sensor body comprising a pressure chamber having a pressure port that allows fluid pressure communication between the outside of the sensor body and the pressure chamber, wherein the pressure sensing elements are located inside a protection and coupling mechanism which separates the pressure sensing elements from fluid inside the pressure chamber but transmits changes in pressure of the fluid in the pressure chamber to the sensing elements.

10. The sensor as claimed in claim 9, wherein the protection and coupling mechanism comprises fluid-filled bellows surrounding the sensing elements.

11. The sensor as claimed in claim 8, comprising resistivity sensing elements, the sensor body having an insulating coating on the outer surface with at least one current injection electrode and at least one monitoring electrode provided on the outside of the body.

12. The sensor as claimed in claim 11, comprising pairs of current and monitoring electrodes.

13. The sensor as claimed in claim 11, wherein the or each current electrode is connected to a current generator, and the or each monitoring electrode is connected to a voltage generator.

14. The sensor as claimed in claim 8, comprising resistivity sensing elements including a toroidal antenna formed around the sensor body.

15. The sensor as claimed in claim 14, further comprising an electrode for radiating current into the formation.

16. The sensor as claimed in claim 14, comprising two toroidal antennae, one acting as an emission antenna, the other acting as a monitoring antenna.

17. The sensor as claimed in claim 8, comprising resistivity sensing elements including a coil antenna formed on the sensor body for measuring electrical impedance of the formation.

18. The sensor as claimed in claim 17, comprising two coil antennae, one acting as an emission antenna, the other acting as a monitoring antenna.

19. The sensor as claimed in claim 8, comprising strain sensing elements, a strain gauge being mounted in the sensor body near to the portion that is sealed to the tubing or casing.

20. The sensor as claimed in claim 19, wherein the strain gauge is oriented to measure vertical or tangential deformation of the tubing or casing.

21. A method of installing a sensor as claimed in claim 1, comprising:
   drilling a hole through the casing or tubing at a location of interest;
   installing a sensor as claimed in any of claims 1–20 in the hole; and
   sealing the sensor in the hole such that there is no fluid communication between the inside and the outside of the casing or tubing through the hole.

22. The method as claimed in claim 21, wherein the steps of drilling, installing and sealing are performed by a tool that can be moved through the well to a number of locations.

23. The method as claimed in claim 21, comprising loading the tool with a number of sensors and installing the sensors at spaced locations in the well.

24. A sensor system for installation in an underground well having a casing or tubing installed therein, the system comprising one or more sensors as claimed in claim 1 installed in the tubing or casing, and a communication device that can be positioned inside the well to communicate with the sensor elements of the or each sensor via the respective communication elements.

25. The sensor system as claimed in claim 24, wherein the communication device comprises a sonde that can be moved through the well and that communicates with the sensors by wireless communication.

26. The sensor system as claimed in claim 24, wherein the well comprises a cased well having a tubing located therein, the sensors being installed in the casing and the communication device being positioned inside the tubing, wherein the portion of the tubing in the region of the sensors is constructed so as to allow communication between the sensors and the communication device.

27. The sensor system as claimed in claim 26, wherein the tubing has non-conductive portions in the region of the sensors.

28. The sensor system as claimed in claim 24, wherein the well comprises a cased well having a tubing located therein, the sensors being installed in the casing and the communication device being located on the outside of the tubing near to the sensors.

29. A method of monitoring an underground formation surrounding a well, comprising:
   installing a number of sensors according to claim 1 in the well;
   monitoring variation in the measurements made by the sensors over time;
   and inferring formation properties from the time varying measurements.

30. The method as claimed in claim 29, wherein the sensors are pressure sensors, the method comprising measuring the time varying flow rate of fluids from the well over a period of time; monitoring time varying pressure at each of the sensors over the period of time; and determining the contribution of a layer in which a sensor is installed to the overall flow from the time varying flow rate and the time varying pressure measured at the respective sensor.

31. The method as claimed in claim 29, wherein the sensors are pressure sensors installed above a perforated region of the well, the method comprising monitoring time varying pressure gradient between a pair of the sensors over a period of time so as to determine changes in formation fluid density; and determining gas entry into the well through the formations from the determined changes in formation fluid density.

32. The method as claimed in claim 29, wherein the sensors are pressure sensors installed in a cap rock above a producing formation, the method comprising monitoring time varying pressure measurements with the sensors over a period of time; and detecting any leakage at the cap rock level from the determined time varying pressure measurements.

33. The method as claimed in claim 29, wherein the sensors are pressure sensors installed in a first well, the method comprising varying the flow rate of fluids from a second well spaced from the first well but in the same producing formation over a period of time so as to create a pressure pulse in the reservoir; monitoring time varying pressure at each of the sensors in the first well over the period of time; and determining the inter-well permeability from the time varying measurements.

34. The method as claimed in claim 29, wherein the sensors are resistivity sensors installed in a producing well at the level of a producing formation, the method comprising injecting water over a period of time into the producing formation from an injection well spaced from the producing well; monitoring variation of resistivity measured at the sensors in the producing well over the period of time as the water is injected; and determining progress of a water front through the producing formation from the measured resistivity.

35. The method as claimed in claim 29, wherein the sensors are resistivity sensors installed below a perforated interval of the well, the method comprising measuring the resistivity at the sensors over time, and determining the advance of water towards the perforated interval from the resistivity measurements.

* * * * *